(12) United States Patent
Teraji

(10) Patent No.: US 6,690,819 B1
(45) Date of Patent: Feb. 10, 2004

(54) METHOD AND APPARATUS FOR RECOGNIZING COMPONENTS

(75) Inventor: Takashi Teraji, Chofu (JP)

(73) Assignee: Juki Corporation, Tokyo (JP)

( * ) Notice: Subject to any disclaimer, the term of this patent is extended or adjusted under 35 U.S.C. 154(b) by 0 days.

(21) Appl. No.: 09/500,716

(22) Filed: Feb. 9, 2000

(30) Foreign Application Priority Data

Feb. 12, 1999 (JP) ............................................ 11-033595

(51) Int. Cl.$^7$ ................................................. G06K 9/00
(52) U.S. Cl. ........................ 382/147; 382/146; 348/126
(58) Field of Search ................................. 382/141, 147, 382/146, 150, 151, 154; 348/87, 94, 126; 356/398, 237.4, 388, 395, 151; 250/559.44, 559.23

(56) References Cited

U.S. PATENT DOCUMENTS

| 5,023,916 | A | * | 6/1991 | Breu | .......................... | 382/150 |
| 6,353,676 | B1 | * | 3/2002 | Li | .............................. | 382/145 |
| 6,396,942 | B1 | * | 5/2002 | Chang et al. | ............... | 382/141 |

FOREIGN PATENT DOCUMENTS

JP  Hei 7-320062  12/1995
JP  2516844  7/1996

* cited by examiner

Primary Examiner—Samir Ahmed
(74) Attorney, Agent, or Firm—Milbank, Tweed, Hadley & McCloy, LLP

(57) ABSTRACT

A method and apparatus for accurately recognizing most of components available in the market with moderate illuminating condition in high speed image processing are disclosed.

After imaging a component having a predetermined electrode pattern, a core electrode 32 is extracted with the image being swept from a corner 33a (S1) through a small window. A H0V0 coordinate system is implemented with the core electrode set as its origin to observe its neighbor electrodes (S2). At this state, electrodes are sequentially extracted through a small window placed in an area predicted from previously extracted electrodes. Thereafter, an extracted electrode pattern is produced, and coordinates of its electrodes are obtained. Then, the extracted electrode pattern is collated with the predetermined electrode pattern by overlaying with each other for positioning (S3). When a mismatch number between both of the patterns reports a minimum, image coordinates for the electrodes of the predetermined electrode pattern are determined from the extracted electrode coordinates. With such a process, electrodes are extracted in high speed, and their coordinates are determined accurately.

21 Claims, 34 Drawing Sheets

Fig.2
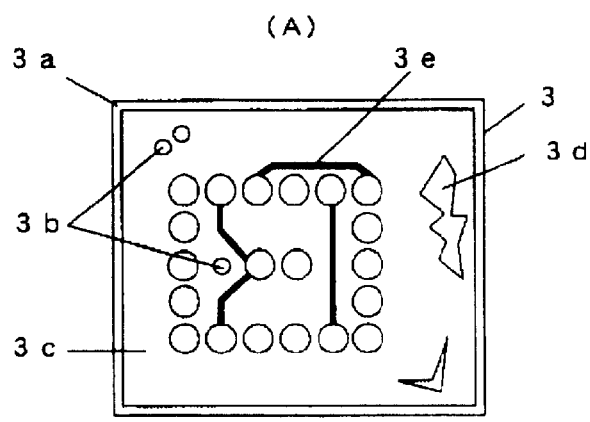
(A)
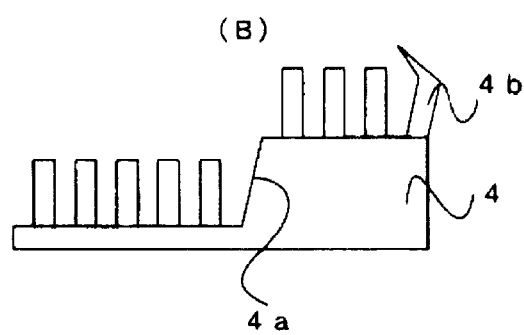
(B)
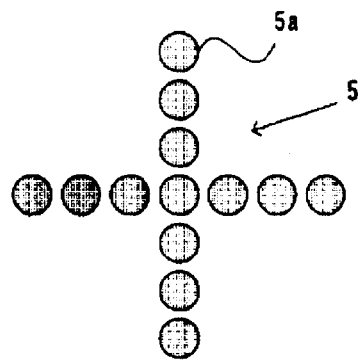
(C)
(D)
(E)

S0: Initial state
S1: Core electrode finding state
S2: Neighbor electrode observing state
S3: Origin electrode examining state
S4: Positioning completion state

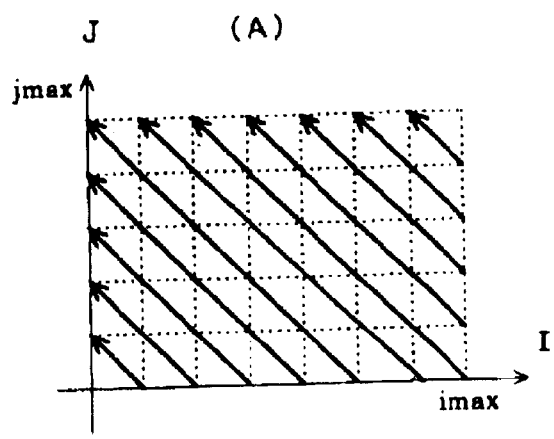
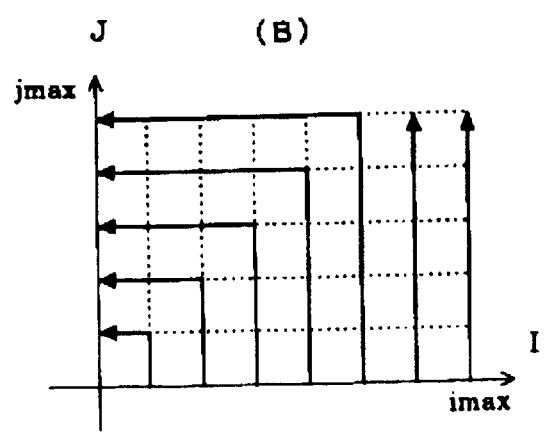
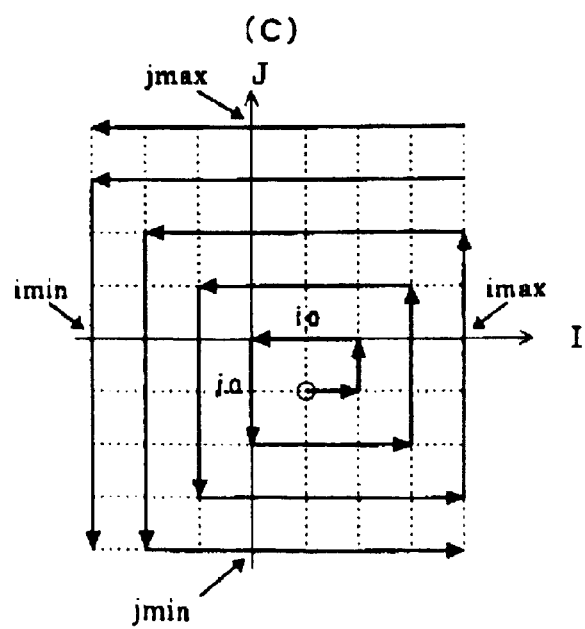
Fig. 9

|   | C 1 | C 2 | C 3 | C 4 | C 5 |
|---|-----|-----|-----|-----|-----|
| C 1 | — | 1 0 | 6 | 5 | $\varepsilon$ |
| C 2 | $\varepsilon$ | — | $\varepsilon$ | $\varepsilon$ | $\varepsilon$ |
| C 3 | $\varepsilon$ | $\varepsilon$ | — | $\varepsilon$ | $\varepsilon$ |
| C 4 | $\varepsilon$ | $\varepsilon$ | $\varepsilon$ | — | $\varepsilon$ |
| C 5 | $\varepsilon$ | $\varepsilon$ | $\varepsilon$ | $\varepsilon$ | — |

Fig. 24
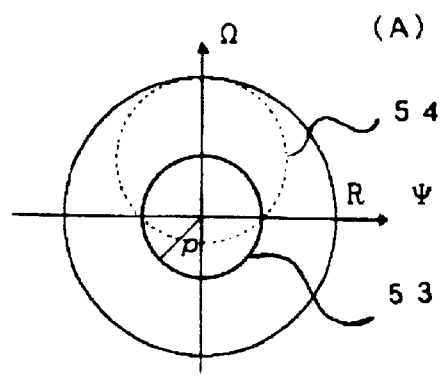
(A)
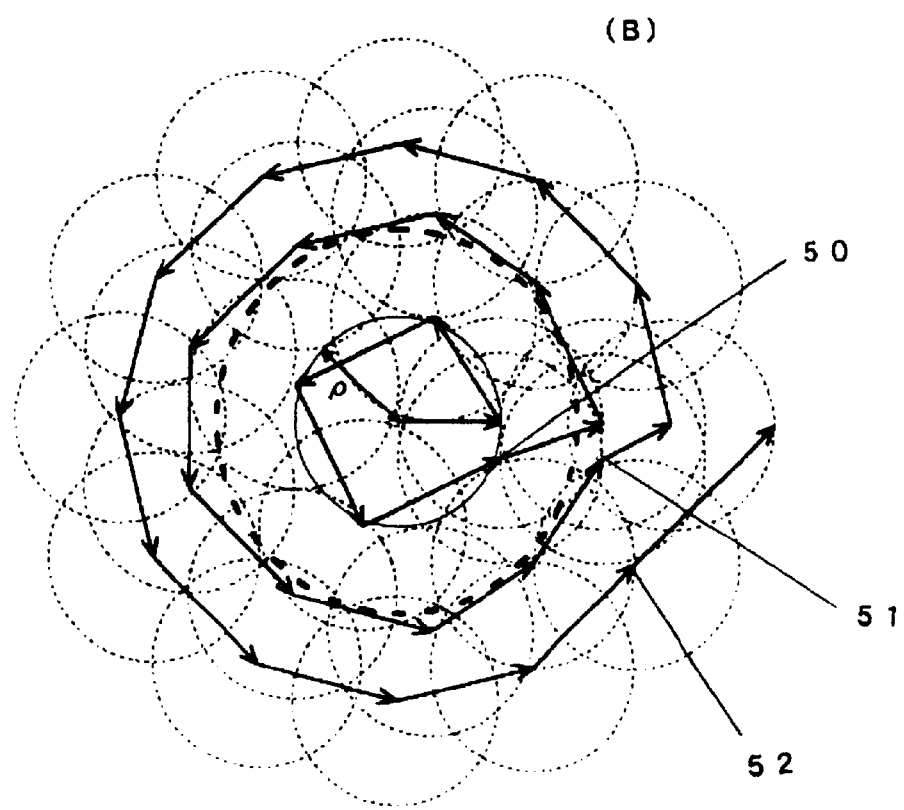
(B)

Fig. 26
(A)
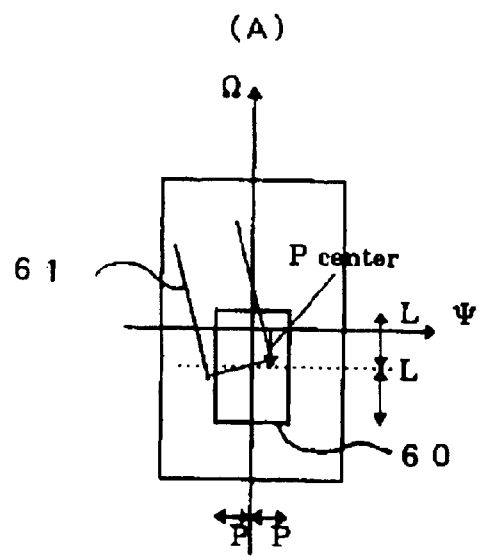
(B)
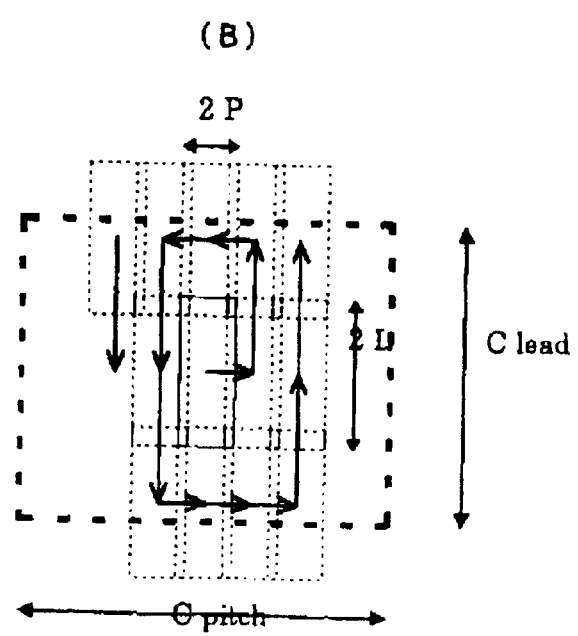

| Storage Position | Operation Flag | Direction Code | Vertex Number | Vertex Coordinate | Brightness Gradient Vector |
|---|---|---|---|---|---|
| 0 | | | | | |
| 1 | | | | | |
| | | | | | |
| | | | | | |

Fig. 34
(A)
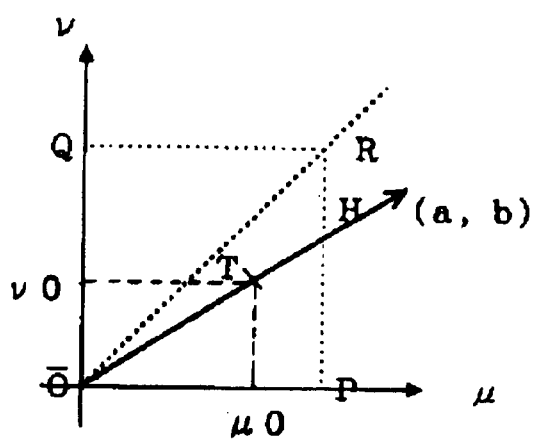
(B)
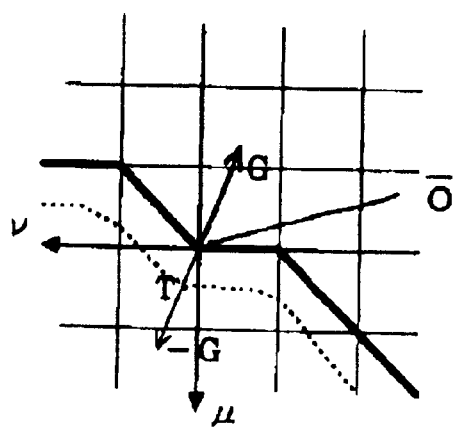

Fig.37
(A)
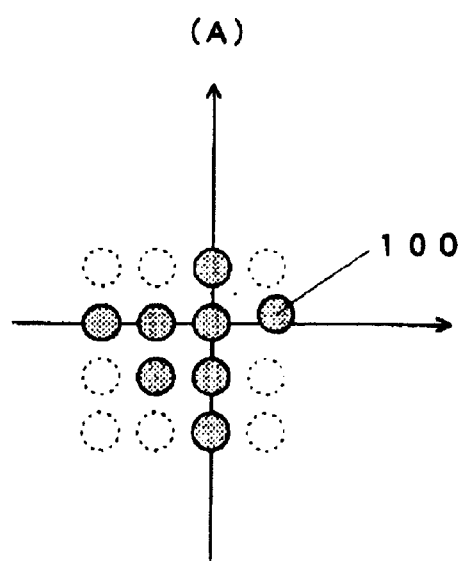
(B)
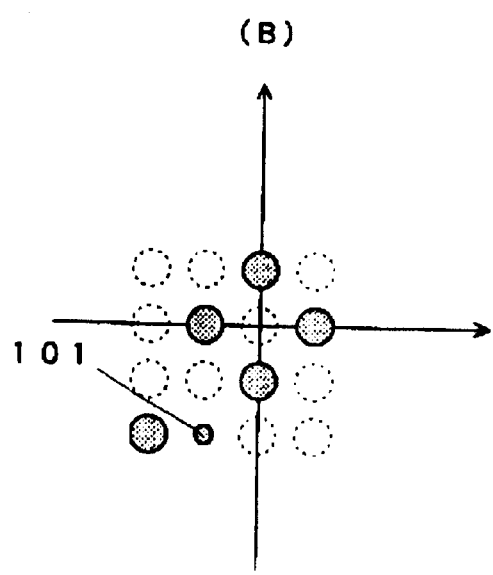

P0: Electrode feature value initial state
P1: Electrode feature value undetermined state
P2: Electrode feature value determined state
Z0: Electrode position initial state
Z1: Electrode grid undetermined state
Z2: Electrode grid determined state

Fig. 42

|   | ① | ② | ③ | ④ | ⑤ | ⑥ |
|---|---|---|---|---|---|---|
| C 1 | 0 | * | * | * | * | * |
| C 2 | * | 0 | * | * | * | * |
| C 3 | * | * | 0 | * | * | * |
| C 4 | * | * | * | 0 | * | * |
| C 5 | * | * | * | * | * | 0 |

Fig. 43

|   | ① | ② | ③ | ④ | ⑤ | ⑥ |
|---|---|---|---|---|---|---|
| C 1 | * | * | * | * | * | * |
| C 2 | 0 | * | * | * | * | * |
| C 3 | * | * | * | * | * | * |
| C 4 | * | 0 | * | * | * | * |
| C 5 | * | * | 0 | * | * | * |

Fig. 44

|   | ① | ② | ③ | ④ | ⑤ | ⑥ |
|---|---|---|---|---|---|---|
| C 1 | * | * | * | * | * | * |
| C 2 | * | * | 4 | * | * | * |
| C 3 | * | * | * | 4 | * | * |
| C 4 | * | * | * | * | 4 | * |
| C 5 | * | * | * | * | * | 4 |

METHOD AND APPARATUS FOR RECOGNIZING COMPONENTS

BACKGROUND OF THE INVENTION

1. Field of the Invention

The present invention relates to a method and apparatus for recognizing components, and more particularly to a method and apparatus for recognizing components in which electrodes of an electronic component are determined to be positioned on a image coordinate system in an electronic component surface mounting machine or the like.

2. Description of the Prior Art

In electronic component surface mounting machines, a component is generally picked up by a vacuum nozzle at component supply stations and placed on a printed circuit board. Since the component is not always picked up in a correct state by the vacuum nozzle, the picked-up component is usually imaged by a CCD camera and recognized. If the component is not picked up in a correct state, both angular and coordinate positions are corrected based on the recognized data.

FIG. 1 illustrates a conventional method of recognizing components. FIG. 1(A) is an image of a bottom surface 1 of a BGA (Ball Grid Array) type IC, the image being captured by reflected light from an electrode side, showing a plurality of ball electrodes $1a$, $1b$, $1c$, - - - . FIG. 1(B) is an image of a leaded component such as a connector, PLCC (Plastic Leaded Chip Carrier) or the like, showing lead pins $2a$, $2b$, $2c$, - - - mounted on a body 2. An input image is represented by brightness levels, and pixel positions are designated on an XY coordinate system. Since the electrode patterns and dimensions of components are previously known, the image is generally accessed limited, for speeding up image processing, to a search area 1' or 2' in FIG. 1 defined in the image so as to enclose an electrode set, including both of the coordinate and angular deviations of an absorbed position by the vacuum nozzle.

In FIG. 1(A), the image is scanned in a horizontal (X) direction within the search area 1'. With pixel values, namely brightness, obtained by the scanning being represented at Z-axis, a brightness diagram is obtained as shown in FIG. 1(C). Lines a, b and c in FIG. 1(C) correspond to the scanning lines a, b and c on the image in FIG. 1(A). Since the periodic distance T between peaks on the diagram equals that between the electrodes, the scanning line c means that it runs across an electrode array. The X coordinate of the electrode $1a$ is x0 corresponding to that of the peak on the line b in FIG. 1(C), and a Y coordinate y0 can be calculated by interpolating the Y coordinates of the lines b and c. Coordinates of the other electrodes are similarly figured out successively. As to the scanning direction, it may be possible to scan in a vertical direction or in 45° slant direction, in addition to the horizontal scanning, so as to increase the reliability of detected positions.

In case of a leaded component shown in FIG. 1(B), scanning the image creates waveforms corresponding to a lead alignment having the same periodic distance as that of lead pins. Therefore, top end coordinates of the lead pins $2a$, $2b$, $2c$, - - - can be calculated by applying the same process as in the BGA case.

However, in the conventional method of recognizing components, there exist some types of components that are difficult or impossible to recognize, because the method depends on brightness values that the scanning lines output. FIG. 2 illustrates some examples. FIG. 2(A) shows a BGA component 3 which includes obstructions such as an outer frame $3a$, spurious electrodes $3b$, a body $3c$ contaminated with noise, structure parts $3d$, and printed patterns $3e$. When this BGA component 3 is imaged, the brightness of the above-described obstructions is sometimes higher than that of the target electrodes, which makes the recognition of the electrodes impossible because of output waveforms from these obstacles if the conventional scanning method is employed.

FIG. 2(B) shows an example of leaded components often seen in connectors. A body 4 has height-level difference $4a$, and locking metals $4b$. In an image of the leaded component, brightness of the level difference $4a$ and the metals $4b$ is sometimes higher than that of target pins. Here, at the upper step, the locking metals $4b$ are captured together with the target pins when the conventional scanning method is employed, which makes difficult the detection of the lead pins. And at the lower step, brightness of the level difference $4a$ is not uniform, which also makes difficult the judgment whether the lead pins are real ones.

FIG. 2(C) shows a BGA component 5. This is also difficult to recognize with the use of the conventional method, even though only electrodes $5a$ are clearly obtained in a picture. Due to a cross alignment of electrodes, only one first peak on a waveform is detected even if the picture is scanned in horizontal, vertical or 45° directions (even 45° scanning produces only one peak because the component is usually positioned slightly on a slant), which makes it impossible to apply image processing depending on the detection of periodic peaks. Therefore, for positioning such a component as shown in FIG. 2(C), image processing specialized for the electrode pattern must be practically employed. Furthermore, the problem of the above-mentioned method is that it takes long processing time, which results in long cycle time of mounting components, because scanning of the image requires long processing time proportional to the number of pixels within a whole image area or a part of area.

When applying the conventional recognition method described above, there exist certain components that are difficult or impossible to recognize. For precise recognition there is needed severe lighting/imaging conditions, which results in high cost of apparatus and long image processing time.

For solving the above-described problems, it is an object of the invention to provide a method and apparatus for recognizing components, in which a wide variety of components are recognized precisely with moderate illuminating conditions in less image processing time.

SUMMARY OF THE INVENTION

In order to solve the problems mentioned above, the invention provides for a method and apparatus for recognizing electronic components. In a method for recognizing electrode positions from an image of a component having a predetermined array of electrode pattern, the invention comprises the steps of extracting electrodes with a proper size of small window (hereinafter "window") set in serial order inside the captured image of the component, the window including one electrode, obtaining an extracted electrode pattern and coordinates of the electrodes, collating the extracted electrode pattern with the predetermined electrode pattern by overlaying with each other, and determining image coordinates of the electrodes with respect to the predetermined electrode pattern based on the collated result.

In an apparatus for recognizing electrode positions from an image of a component having a given array of electrode pattern, the invention comprises means for placing a proper size of window in serial order inside the captured image of the component, the window including one electrode, means for extracting electrodes through the window, means for producing an extracted electrode pattern, means for calculating coordinates of the electrodes, means for collating the extracted electrode pattern with the given electrode pattern by overlaying with each other, and means for determining image coordinates of the electrodes with respect to the given electrode pattern based on the collated result.

In this invention, a component having a given array of electrode pattern is imaged, and a core electrode is extracted by sweeping the captured image through a window from a proper corner. After detecting the core electrode, an electrode map coordinate system H0V0 is implemented with the core electrode set as its origin, and the process proceeds to a state capable of observing its neighbor electrodes. In this state, a window is placed at an area predicted from an extracted electrode or an electrode group, and electrodes are extracted in succession. In this manner, an extracted electrode pattern and its electrode coordinates are obtained. Then the extracted electrode pattern is collated with the given array of electrode pattern (a logical or defined electrode pattern) by overlaying with each other, and electrode positions are determined on the electrode map coordinate system. When the mismatch between both patterns (the extracted electrode pattern and the given pattern) becomes minimum, that is, both patterns match most with each other, the image coordinates of the electrodes relative to the given array of electrode pattern are determined from the coordinates of the extracted electrodes. With such arrangement, electrodes are extracted in high speed, and accurate electrode coordinates are determined because the extracted electrode pattern is collated with the given array of electrode pattern.

BRIEF DESCRIPTION OF THE DRAWINGS

FIG. 2 illustrates some electrode patterns or arrangements to be recognized; (A) for a BGA component with obstacles, (B) for a leaded component having height difference, (C) for a cross alignment of electrodes, and (D) and (E) show examples of one line alignment of electrodes.

FIG. 9 illustrates some sweep modes; (A) shows a corner triangle sweep mode, (B) shows a corner rectangle sweep mode, and (C) shows a spiral sweep mode.

FIG. 24 illustrates generation of ball windows in a predicted area with an extraction power ρ.

FIG. 26 illustrates generation of lead windows in a predicted area.

FIG. 34 illustrates a state to figure out a shadow coordinate when finding a ball electrode coordinate.

FIG. 37 illustrates a state that a spurious electrode is extracted.

FIG. 42 is an evaluation table for use with the positioning of electrodes with respect to the pattern shown in FIG. 21.

FIG. 43 is an evaluation table for use with the positioning of electrodes relating to the BGA pattern shown in FIG. 1(A).

FIG. 44 is an evaluation table for use with the positioning of electrodes relating to the BGA pattern shown in FIG. 45.

DETAILED DESCRIPTION OF THE DRAWINGS

A detailed description will now be given of the embodiments of the invention with reference to the accompanying drawings.

Overall Structure

Figure 3:
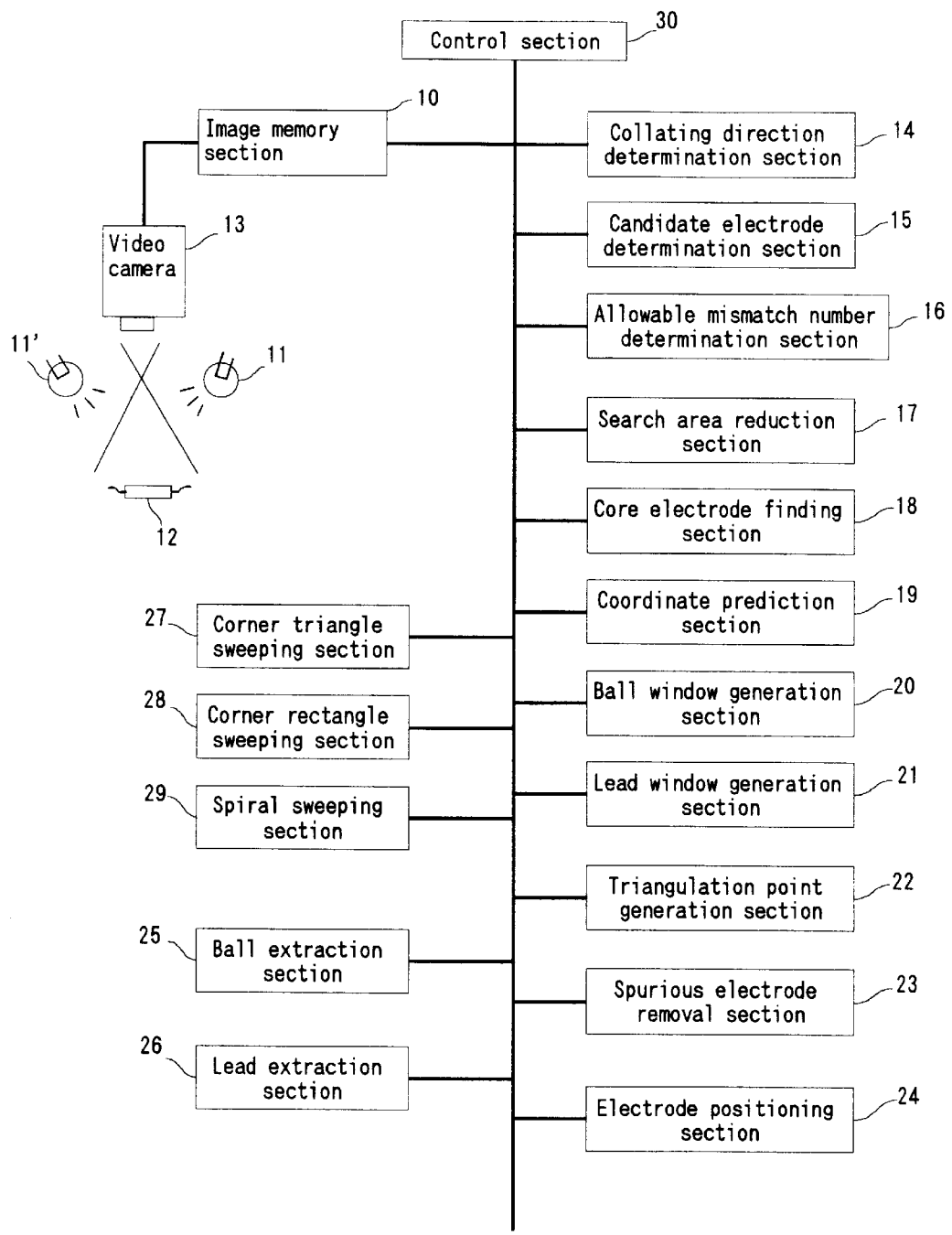
FIG. 3 is a block diagram showing an overall structure of a component recognizing apparatus in accordance with one embodiment of the invention.

FIG. 3 is a block diagram showing an overall structure of an apparatus for recognizing a component in accordance with one embodiment of the invention. An image memory section 10 is means for storing an image with brightness levels of a target component 12, which is illuminated by light sources 11, 11' and imaged by a video camera (CCD camera) 13. A collating direction determination section 14 is means for deciding a corner suitable for recognition of the component 12 from an electrode pattern. A candidate electrode determination section 15 is means for selecting electrodes neighboring the corner of the electrode pattern to assign them to candidates for positioning.

An allowable mismatch number determination section 16 is means for determining an upper limit value, namely an allowable mismatch number, to secure the positioning based on the electrode pattern and the corner thereof. A search area reduction section 17 is means for reducing search area on the image based on the electrode pattern and the corner thereof. A core electrode finding section 18 is means for finding an arbitrary electrode neighboring the specified corner from electrodes existing in the image. A coordinate prediction section 19 is means for predicting a physical coordinate for a specified electrode having a logical coordinate from the logical coordinates and the physical coordinates of previously extracted electrodes.

A ball window generation section 20 is means for generating a window covering a predicted area of the center of an electrode to be extracted in case of recognizing a BGA component, and a lead window generation section 21 is means for generating a window covering a predicted area of the top edge of a leaded electrode to be extracted in case of recognizing a leaded component. Further, a triangulation point generation section 22 is means for generating preferable datum points on a grid net, namely triangulation stationpoints, for the extracted electrodes. A spurious electrode removal section 23 is means for removing spurious electrodes from previously extracted electrodes, and an electrode positioning section 24 is means for finally determining an image coordinate of the target component from the extracted electrode pattern.

A ball extraction section 25 is means for actually extracting an electrode through a window placed inside the image to recognize a BGA component, and a lead extraction section 26 is means for actually extracting a leaded electrode through a window placed inside the image to recognize a leaded component.

A corner triangle sweeping section 27 is means for generating logical coordinates to sweep a rectangular area in a triangle-shape manner, a corner rectangle sweeping section 28 is means for generating logical coordinates to sweep in a rectangular-shape manner, and a spiral sweeping section 29 is means for generating logical coordinates to sweep in a spiral-shape manner.

A control section 30 controls those sections.

A detailed description will now be given of each process of the invention with reference to a general flowchart shown in FIG. 4.

An electrode pattern of a component is an entire rectangular virtual electrode space or its partial space arranged in a grid base consisting of M lines in a vertical direction and N lines in a horizontal one. The component has at least one common corner with the virtual electrode space and has at least one real electrode. A leaded component 7 shown in FIG. 2(E), for example, has an alignment corresponding to M=1 and is so recognized by the same process as for a BGA component 6 shown in FIG. 2(D), which is aligned with M=1. Therefore, a description will be given hereunder of a BGA component having an M×N array as one example of components.

Determination of the Collating Direction

Figure 6:
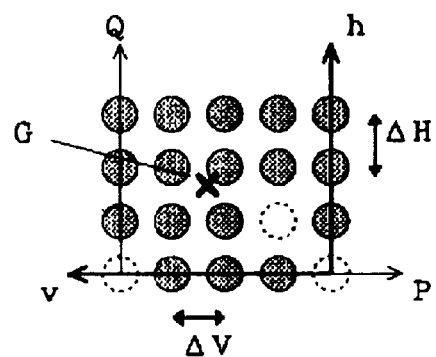
FIG. 6 illustrates a process for calculating a gravity center of an electrode pattern.

First, at step 20, a collating direction is determined by the collating direction determination section 14. Each component has its given array of an electrode pattern, which can be defined, for example, as shown in FIG. 6 as a logical or defined input electrode pattern according to component data and the like. The given logical electrode pattern is represented on a PQ coordinate system. The collating direction determination section 14 calculates a center of gravity from the electrode pattern to determine a favorable corner for recognition. In the pattern shown in FIG. 6, the center of gravity $Gp$ at P axis of the pattern and $Gq$ at Q axis are first calculated by following equations:

$$Gp = [\Sigma(\text{axis distance } (i) \text{ from the origin} \times \text{number of real electrodes in Q direction})]/(\text{total number of real electrodes}),$$

$$Gq = [\Sigma(\text{axis distance } (j) \text{ from the origin} \times \text{number of real electrodes in P direction})]/(\text{total number of real electrodes}).$$

For the example pattern of FIG. 6, $$Gp = (0 \times 3 + 1 \times 4 + 2 \times 4 + 3 \times 3 + 4 \times 3)/17 = 1.94,$$

$$Gq = (0 \times 3 + 1 \times 4 + 2 \times 5 + 3 \times 5)/17 = 1.71.$$

Since the center of the pattern is (2, 1.5), the center of gravity G is located upper left relative to the center of the pattern. Hence, a collating coordinate system hv is prepared in the direction as shown in FIG. 6, and an actual input pattern is transformed on this hv coordinate.

Figure 8:
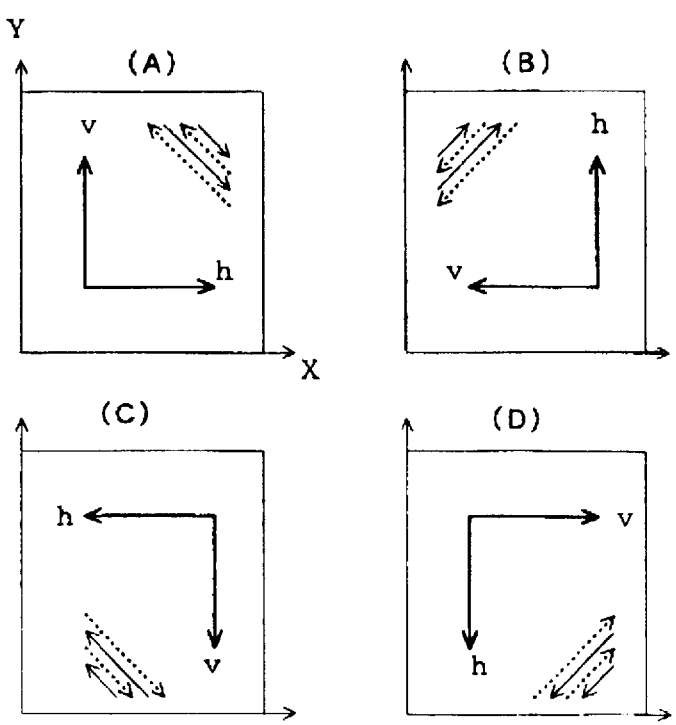
FIG. 8 illustrates how to decide collating directions.

Each direction of hv axes is prepared as shown in FIG. 8 according to the position of the gravity center. FIGS. 8(A) through (D) show the directions of h-axis and v-axis according to the cases where each gravity center is located upper right, upper left, lower left, and lower right, respectively.

Figure 7:
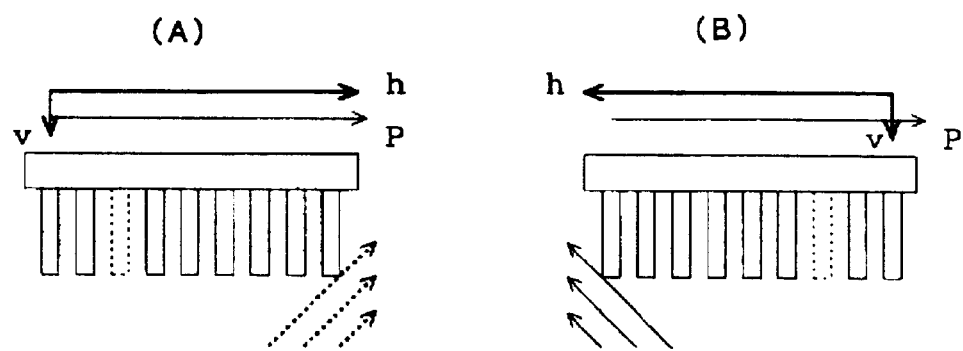
FIG. 7 illustrates how to decide collating directions.

FIG. 7 illustrates setting directions of hv axes for a leaded component. In FIG. 7(A), the gravity center of an input pattern is located at the end side of P coordinate, so an h-axis and a virtual v-axis are directed as shown in the drawing. Since favorable scanning proceeds to a direction as shown by the dotted lines, FIG. 8(D) is employed when the hv coordinate is related to an image coordinate system XY, where the h-axis is exchanged for the v-axis. On the other hand, when the gravity center is located at the origin side of P coordinate as shown in FIG. 7(B), an h-axis and a virtual v-axis are set as in the drawing. Since favorable scanning proceeds to a direction as shown by the solid lines, FIG. 8(C) is employed when the hv coordinate is related to an image coordinate system XY. For a leaded component, as described above, two coordinate systems are prepared for one leaded direction (downward in the example). Since there exist four directions in the actual mounting operation, 4×2=8 kinds of coordinate transformations are prepared.

Figure 17:
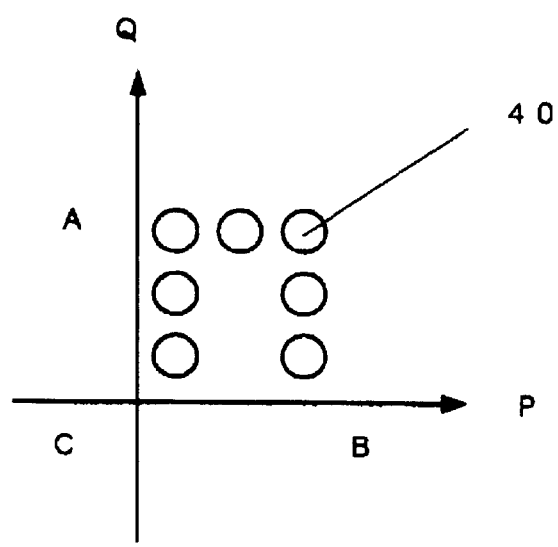
FIG. 17 is an example of a logical or defined electrode pattern of a component.
Figure 18:
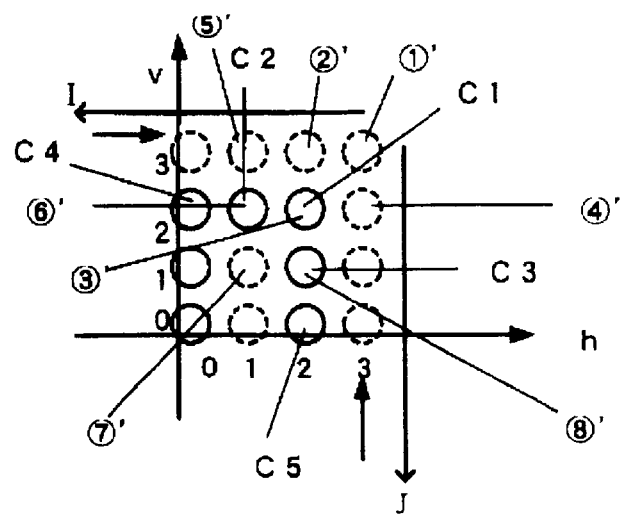
FIG. 18 illustrates a state to produce an allowable mismatch number from the logical or defined electrode pattern.

In a defined electrode pattern shown in FIG. 17, for example, seven electrodes are represented, with the assumption that there are no electrodes in regions A, B, and C. An upper right electrode 40 is determined as a core electrode for positioning by the collating direction determination section 14, and a collating coordinate system (hv) shown in FIG. 18 is implemented. The hv coordinate system is a logical one, and binary values 1 or 0 are respectively assigned to real electrodes or vacant ones. If 0's are assigned to outside virtual electrodes as indicated by arrows to make a 4×4 matrix, collating speed would be increased.

Thus, the most favorable corner for recognition is determined by the collating direction determination section 14, with a coordinate transformation to a collating coordinate system hv.

Determination of the Candidate Electrodes

Figure 4:
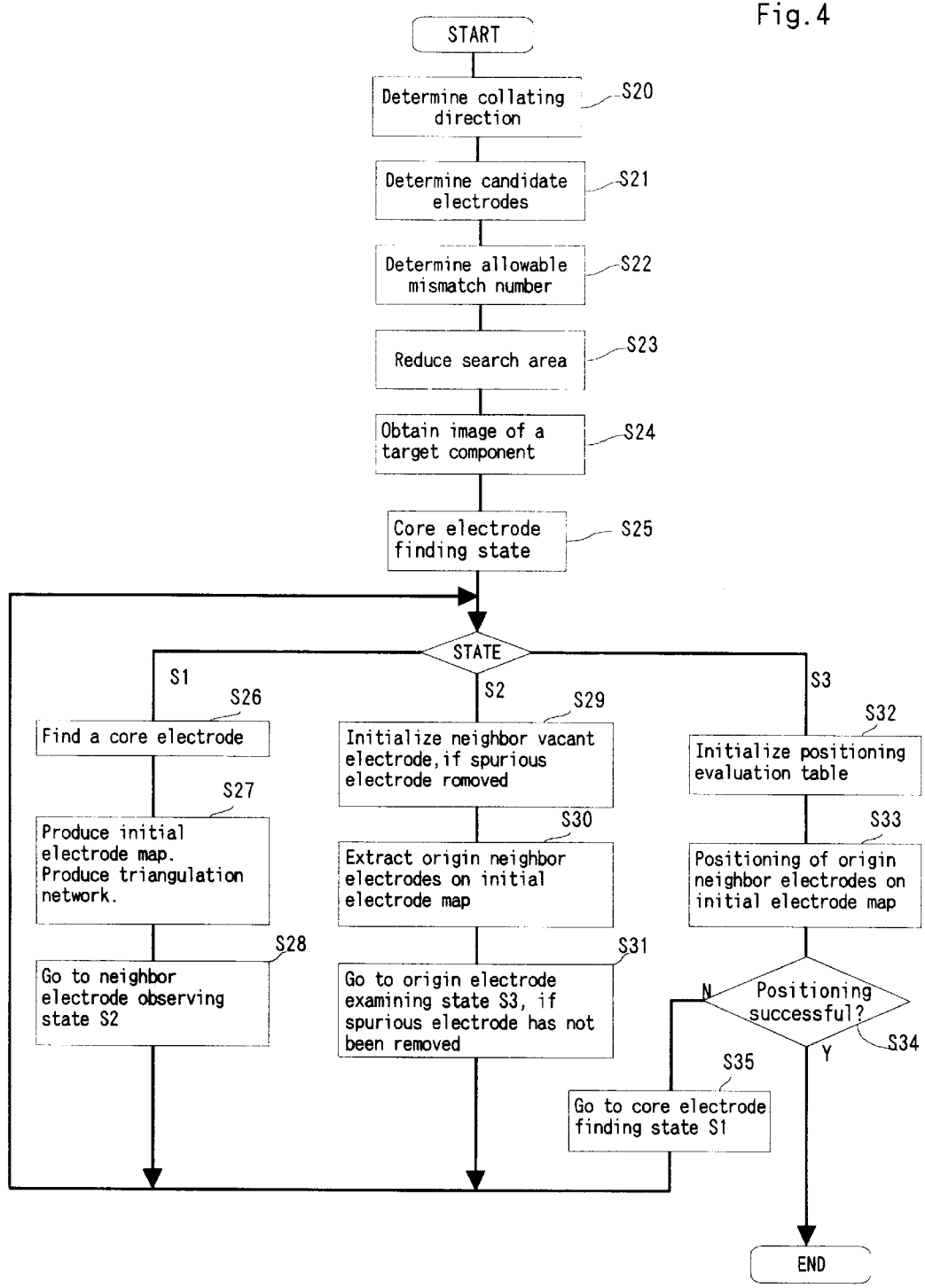
FIG. 4 is a general flowchart showing an overall process of the invention.

At step 21 in FIG. 4, candidate electrodes are determined by the candidate electrode determination section 15. Section 15 is means for selecting electrodes neighboring the corner of an electrode pattern to assign them as candidates for positioning. Candidate electrodes are produced by applying, for example, a corner triangle sweep mode shown in FIG. 9(A). In the corner triangle sweep mode, a first output is (0,0) on a sweep coordinate system IJ, and grid coordinates are generated while the sweeping directs outward from the origin as indicated by arrows. With this process, at an electrode pattern shown in FIG. 10(A), candidate electrodes C1–C5 are produced. A small number of candidate electrodes (5, for example) is enough for processing. The reason is that if the probability to extract an electrode by a window is designated by P, then the probability not to extract all N electrodes is (1–P) to the $N^{th}$ power. If, for example, P=0.9 and N=0.5, then it is $10^{-5}$, extremely small.

Figure 10:
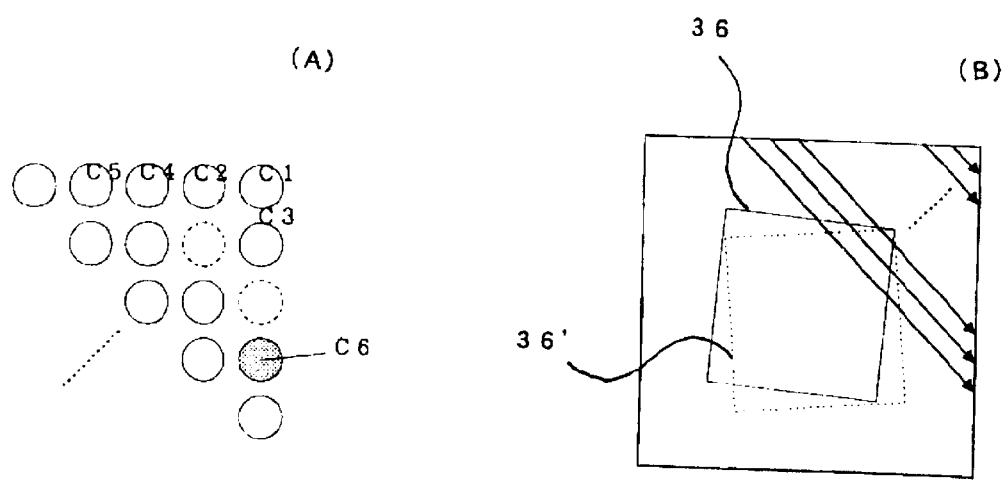
FIG. 10 illustrates selection of candidate electrodes for positioning.

FIG. 10(A) illustrates the process of selecting the candidate electrodes in a certain electrode pattern, where they are obtained by applying the corner triangle sweeping counterclockwise from the upper right corner. At the pattern shown in FIG. 10(A), a candidate electrode C6 is also necessary. For obtaining the electrode C6, the same corner triangle sweep mode will be applied clockwise. This will be easily attained by exchanging the IJ axes. The $5^{th}$ electrode obtained by the clockwise sweeping accords with C6.

The reason for requiring the candidate electrode C6 will be understood referring to FIG. 10(B). When the component is absorbed in a state as shown by a dotted line 36', not by a solid line 36 in the drawing, the electrode C6 will be found earlier than the electrode C5, thereby resulting in less processing time. Another reason is that if the component does not have electrodes C1–C4, and has many electrodes between electrodes C5 and C6 in the example shown in FIG. 10(A), only candidates at C5 side would be chosen when the component is absorbed as shown by the solid line 36, and, to the contrary, only candidates at C6 side when absorbed as shown in the dotted line 36'.

For the electrode pattern as shown in FIG. 17(FIG. 18), candidate electrodes C1–C5 are chosen by the candidate electrode determination means. The content of each candidate is its logical coordinate, for example, C1=(2, 2).

Determination of the Allowable Mismatch Number

Figure 11:
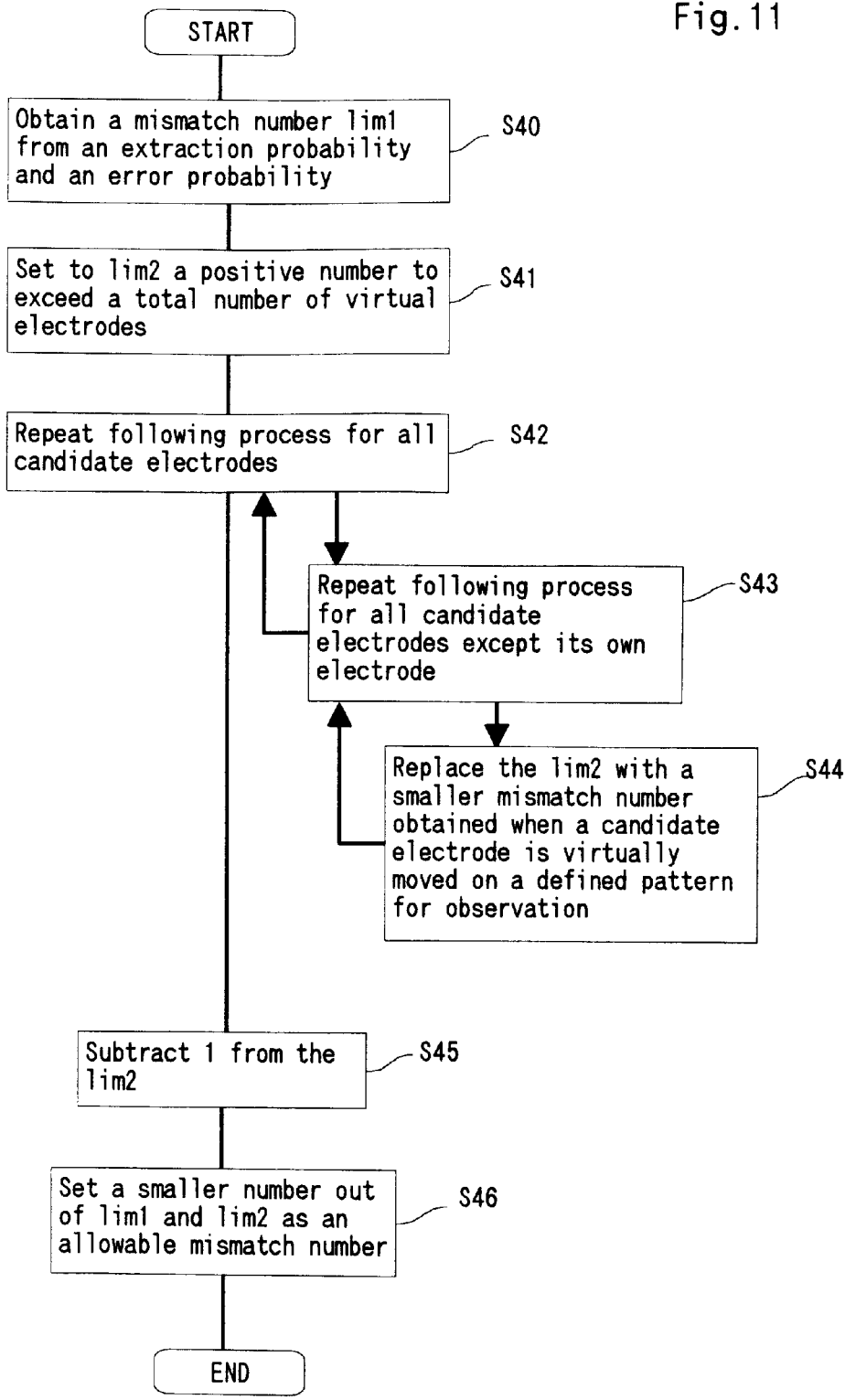
FIG. 11 is a flowchart for determining an allowable mismatch number.

At step S22, the allowable mismatch number determination section 16 determines an upper limit value, namely an allowable mismatch number (non-negative integer "e") to be used for confirming the positioning of electrodes, based on an electrode pattern and its corner. The allowable mismatch number has such nature that, when a certain candidate electrode observes a mismatch number smaller than "e" with respect to its own peripherals, other candidate electrodes always observe a mismatch number larger than "e". When collating an electrode pattern, positioning reliability is enhanced by limiting the mismatch number within the allowable mismatch number. The allowable mismatch number determination section 16 is the means for determining the allowable mismatch number, and FIG. 11 is a flowchart of determination process.

First at step 40, an allowable mismatch number component "lim1" is calculated from an extraction probability P and an error probability Q. For example, if the probability to extract an electrode, when an electrode is inside a window, is P (for example, 0.95), and the probability to erroneously extract other electrode, when an electrode is not inside a window, is Q (0.05, for example), then $$\text{lim1}=[(1-P)\times(\text{number of electrodes})]'+[Q\times(\text{number of circumference electrodes of } N*M \text{ virtual electrodes})]',$$

where each member is a rounded integer. For the arrangement shown in FIG. 17, $$\text{lim1}=[(1-0.95)\times7]'+[0.05\times8]'=0+0=0.$$

At step 41, a natural number over the total number of the virtual electrodes is set to "lim2" as a discrimination distance. The discrimination distance lim2 is a feature value intrinsic to the electrode pattern, and a non-negative integer. To say intuitively, in case of an electrode pattern arranged in a limited area of two-dimensional plane, if the same plane is overlaid, no mismatch will be found, but if overlaid with at least one electrode shifted, a mismatch number (>0) will be observed. When the above shifted overlaying is repeated by the number of candidate electrodes, the minimum mismatch number observed is designated by k (>0). Since an actual mismatch number is "0" when it is true, and more than k when fault, lim2=k–1 is a maximum number to discriminate both patterns favorable in practical field.

Figures 12, 13:
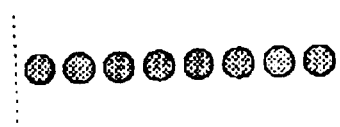
FIG. 12 is a table produced in the process of determining the allowable mismatch number.
FIG. 13 is an example of electrode pattern (one dimensional array of electrode without a vacant one) used for determining an allowable mismatch number.

FIG. 12 shows how to obtain the "k" for the pattern shown in FIG. 17. The vertical column indicated by the candidate electrodes C1–C5 denotes the origin position of HV coordinate system. The horizontal row denotes the candidate electrodes C1–C5 to observe the electrodes with respect to the origin electrode. Values on the table 12 represent minimum mismatch numbers observed, assuming each candidate electrode itself for observing the electrodes to be the origin of the HV coordinate. The observation order is from the top to the bottom and from the left to the right in the table. ϵ's are values over the minimum number at the observation timings.

A detailed description will be given of the method of obtaining the mismatch number. For instance, a first minimum value 10 in FIG. 12 is a mismatch number that the electrode C2 observes when the origin of the HV coordinate is located on the C1. Referring to FIG. 18, the 4×4 binary electrode pattern is swept by the corner rectangular sweep mode as shown in FIG. 9(B) from the upper right corner electrode ①(binary 0), to take out all electrodes (①', ②', ③', - - - ) in the pattern. Every time each electrode is taken out, coincidence of binary value for each electrode is checked between the case of C1 to be the origin (true origin) and the case of C2 to be the origin.

In more detail, first, ①' is displaced by (2,1) from C2, and its binary value is 0 (vacant electrode). The position displaced (2,1) from the true origin C1 locates outside the pattern space, thereby being binary 0. Since both binary values are 0's to the electrode ①' for both cases of the origin to be at C1 or C2, they coincide. Similarly to the electrode ②', both binary value are 0's, to coincide.

Next for the electrode ③', binary value is 1, and displacement from the C2 is (1,0). The displaced position by the same value from the origin C1 is occupied by ④', then the binary value is 0. The electrode ③' is observed as a real electrode (=1) from C2, and as a vacant electrode (=0) from the true origin C1, then a first mismatch arises.

For the successive electrodes ④', ⑤', both of binary values are 0's, to thereby produce no mismatch. Next electrode ⑥' is skipped because of itself. For the electrode ⑦', it is binary 0, and its displacement from C2 is (0,−1). The same displacement from C1 positions to ⑧', and its binary value is 1, then produces a mismatch, resulting in the mismatch number 2. At the next electrode ⑧', another mismatch similarly arise, thereby counting to 3 in the mismatch number. For the rest of all electrodes, similar processes are applied. Since the areas A, B, C in FIG. 17 are vacant, the same processes are further repeatedly applied to electrodes virtually aligned to left next to v-axis (h=−1), and to lower next to h-axis (v=−1), all electrodes being binary 0's (step S42). As a result, the mismatch number is counted to 10, the minimum value at this time.

In FIG. 12, the same process will be successively executed as described above with the electrode C3 assumed as an origin. A mismatch number is counted for every electrodes ①', ②', ③' - - - , thereby being observed a mismatch number 6. This value is smaller than 10, then the minimum value is replaced to 6. Similarly, a mismatch number 5 is recorded as the minimum value when the similar process is executed with the electrode C4 assumed as an origin. Therefore, the mismatch minimum value k=5 is obtained. The above-described processes correspond to steps S43 and S44, where, when the obtained mismatch number is smaller than lim2, the number will substitute for the lim2 (step S44).

Figure 1:
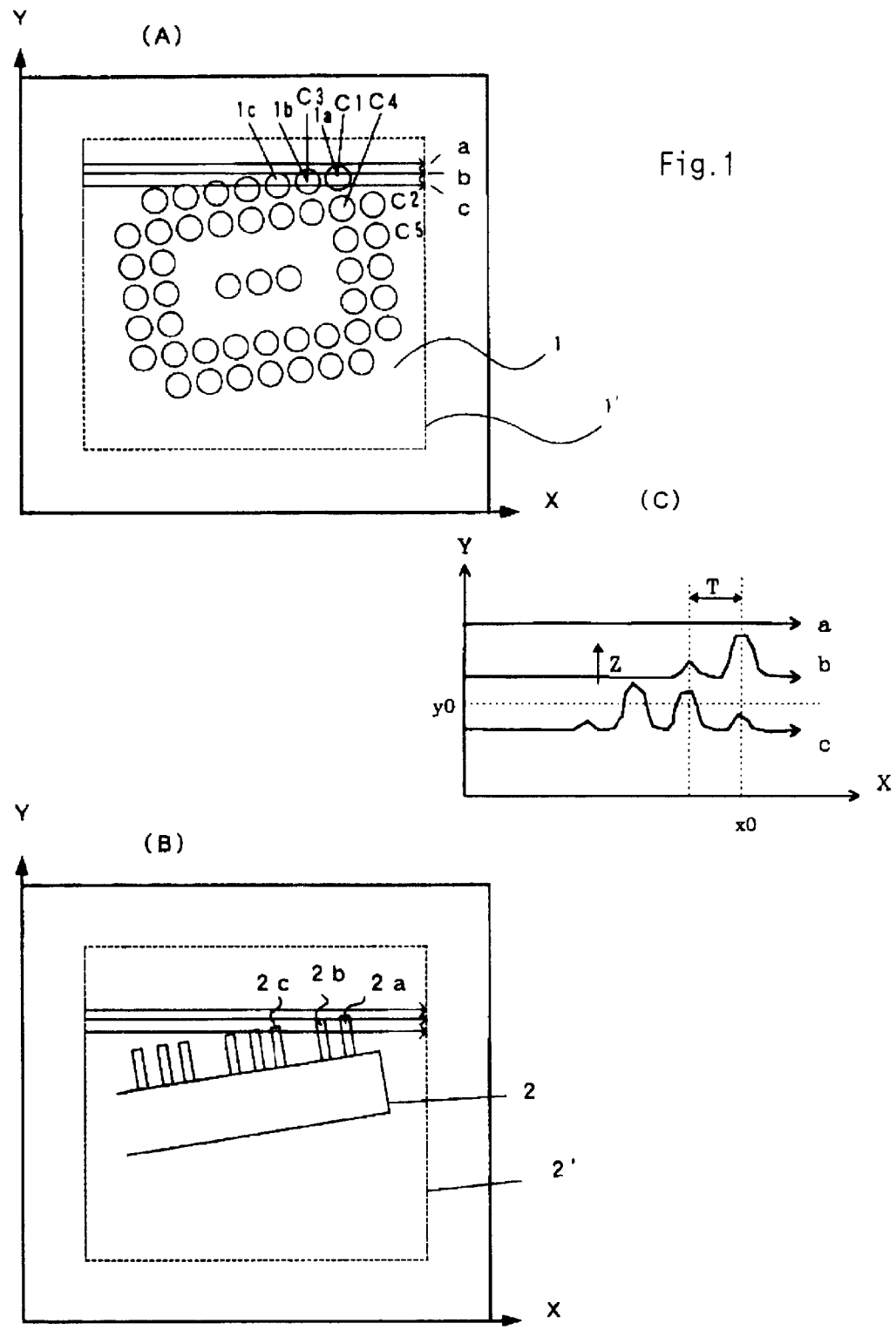
FIG. 1 illustrates a conventional method of parts recognition; (A) shows a bottom surface of a BGA array, (B) shows a leaded component, and (C) shows a brightness diagram for the BGA.

Care should be taken in the case of FIG. 17 that all of areas A, B, C are not vacant. In other words, when it is unknown whether electrodes are in these areas, the number k is extremely reduced. For example, k=1 for the pattern shown in FIG. 17. For a one-dimensionally aligned pattern without a vacant electrode as shown in FIG. 13, k=2 when the left side of a dotted line is vacant, and k=1 when unknown, irrelevant to its length. For the pattern shown in FIG. 1, k=17 when the areas A, B, C are unknown.

After the two values lim1 and lim2 are obtained as described above, 1 is reduced from the lim2 at step S45. At step S46, an allowable mismatch number "e" is obtained by e=MIN {lim1, lim2}.

For the pattern shown in FIG. 17, e=0 because lim1=0 and lim2=5−1=4.

With the process as described above, the allowable mismatch number e is obtained to confirm the positioning on the image coordinate.

Reduction of the Search Area

At step S23 in FIG. 4, the search area reduction section 17 can reduce a search area from an electrode pattern and its corner. While a search area is restricted by the area of nozzle absorbing point, the search area can be further reduced utilizing the electrode pattern, to thereby shorten the processing time for positioning.

Figure 14:
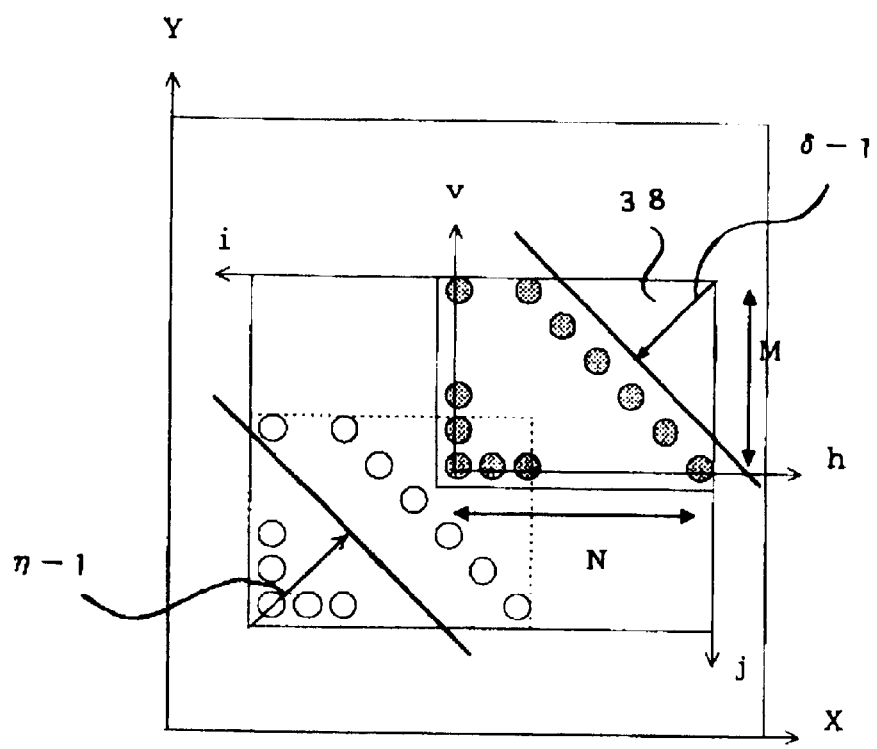
FIG. 14 illustrates reduction of search area at the time of searching electrodes.
Figure 15:
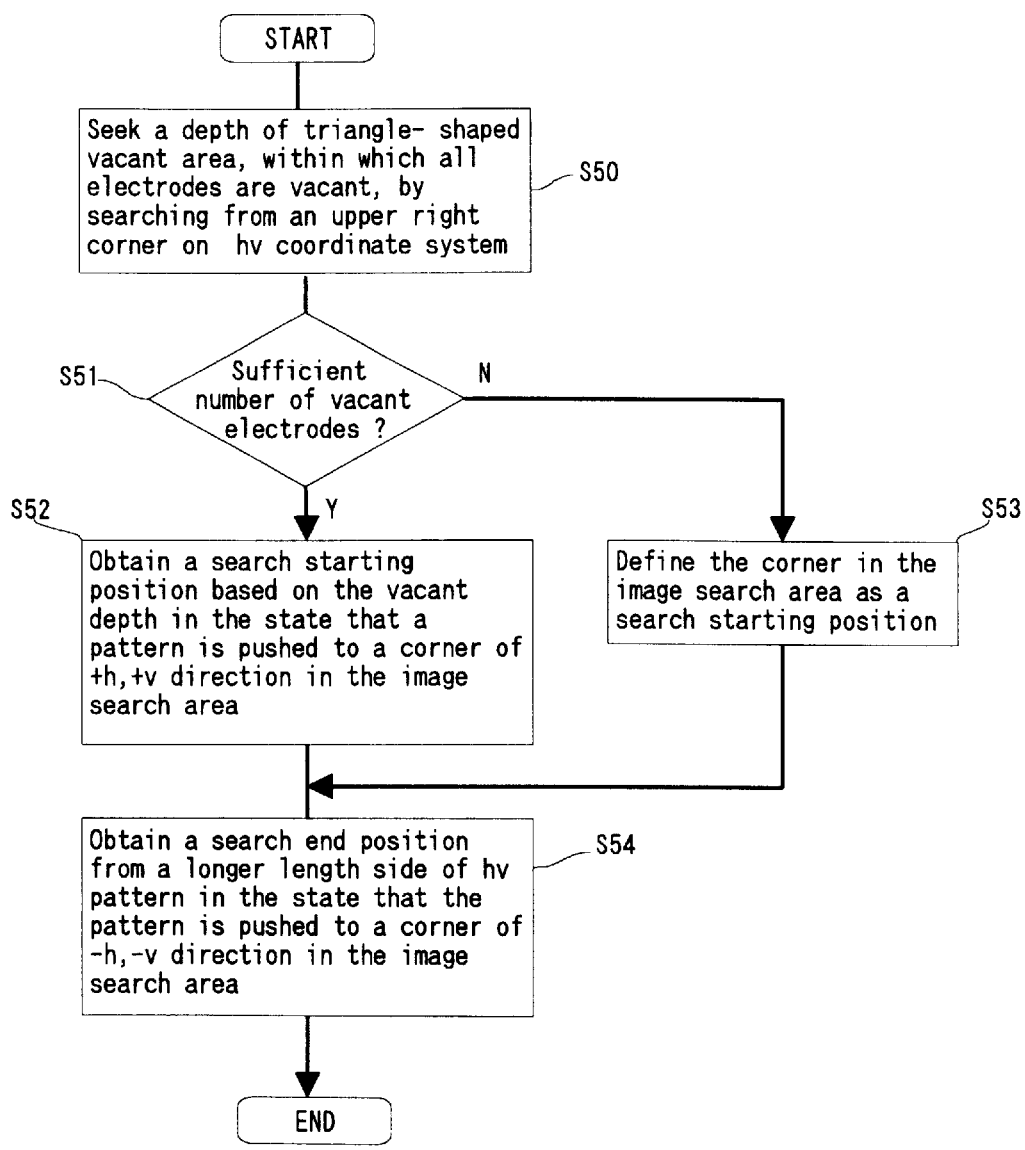
FIG. 15 is a flowchart showing a reduction process of search area when searching electrodes.

FIG. 14 illustrates the reduction of the search area, and FIG. 15 is a flowchart showing a reduction process. In FIG. 14 a corner triangle coordinate system ij is shown together with a collating coordinate system hv. First at step S50, search operation begins from the upper right corner on the hv coordinate system to obtain a depth of a triangular vacant area 38 where no electrode resides. The depth 38 is obtained by sweeping the electrode pattern image from the upper right corner by the corner triangle sweep mode shown in FIG. 9(A). From the coordinate (i, j) of an electrode (=1) first hit, a displacement δ in the axis directions is found, whereby a starting search line is drawn at the position displaced by δ−1 as shown in FIG. 14.

As to a search area reduction at the lower left corner, assuming that a real electrode exists at least within a displacement η={M−1, N−1}, it is enough to set a last search line at the position displaced by η−1 from the lower left corner as shown in FIG. 14.

In the pattern shown in FIG. 17, the reduction process will not be applied because of its small pattern.

Obtaining an Image

Next, at step S24, a component is imaged. The component is photographed by the video camera 13, and the image is stored into the image memory section 10. It is not always necessary in the invention to capture all electrodes if the component has many electrodes. It is also allowable to image elements other than the electrodes. But most of target electrodes of the component are assumed to be imaged. Each component shown in FIG. 2 meets this assumption, thereby being recognized with high accuracy in the invention.

Searching a Core Electrode

In succession, at steps S25, S26 in FIG. 4, the core electrode finding section 18 searches out a core electrode. The core electrode is the electrode first extracted by searching the image captured by step S24 on the slant from the corner determined by the collating direction determination section 14.

Figure 22:
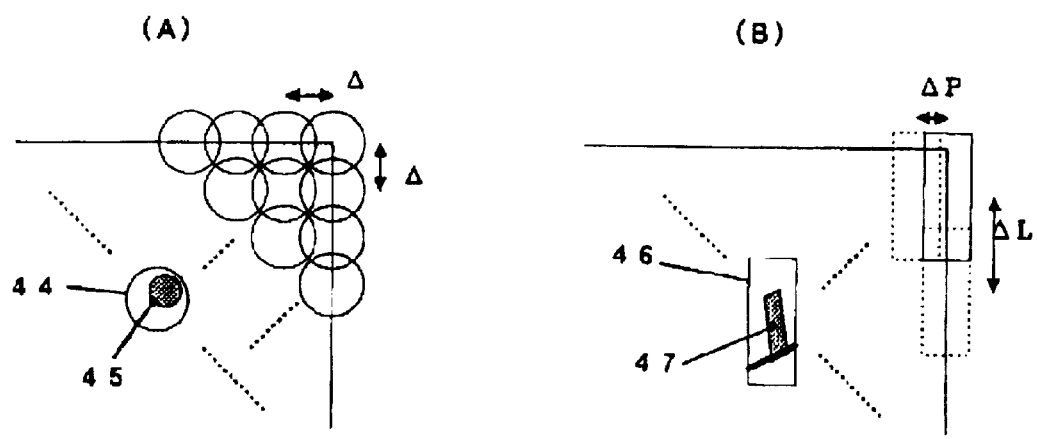
FIG. 22 illustrates extraction of a core electrode; (A) for a ball electrode, and (B) for a leaded electrode.

FIG. 22 illustrates extraction of a core electrode, (A) for a ball electrode, and (B) for a leaded electrode. For both cases, a search area is expanded in triangular shape from a corner, with application of the corner triangle sweep mode shown in FIG. 9(B). In FIG. 22(A), an axis distance A between balls is preferable to take Δ=(4/3)ρ, where ρ is a radius called a ball extraction power of a window, which will be explained later (FIG. 24(A)). FIG. 22(A) illustrates the extraction of a core electrode (electrode on a net) with a window 44 sweeping electrodes in the corner triangle sweep mode.

In FIG. 22(B), axis distance between windows has ΔP in a pitch direction and ΔL in a lead direction. It is preferable to put ΔP=(4/3)P and ΔL=(4/3)L, where P and L are lengths called lead extraction powers of a window, which will be explained later (FIG. 26(A)). FIG. 22(B) illustrates the extraction of a core electrode (electrode on a net) with a window 46 sweeping electrodes in the corner triangle sweep mode.

Figure 5:
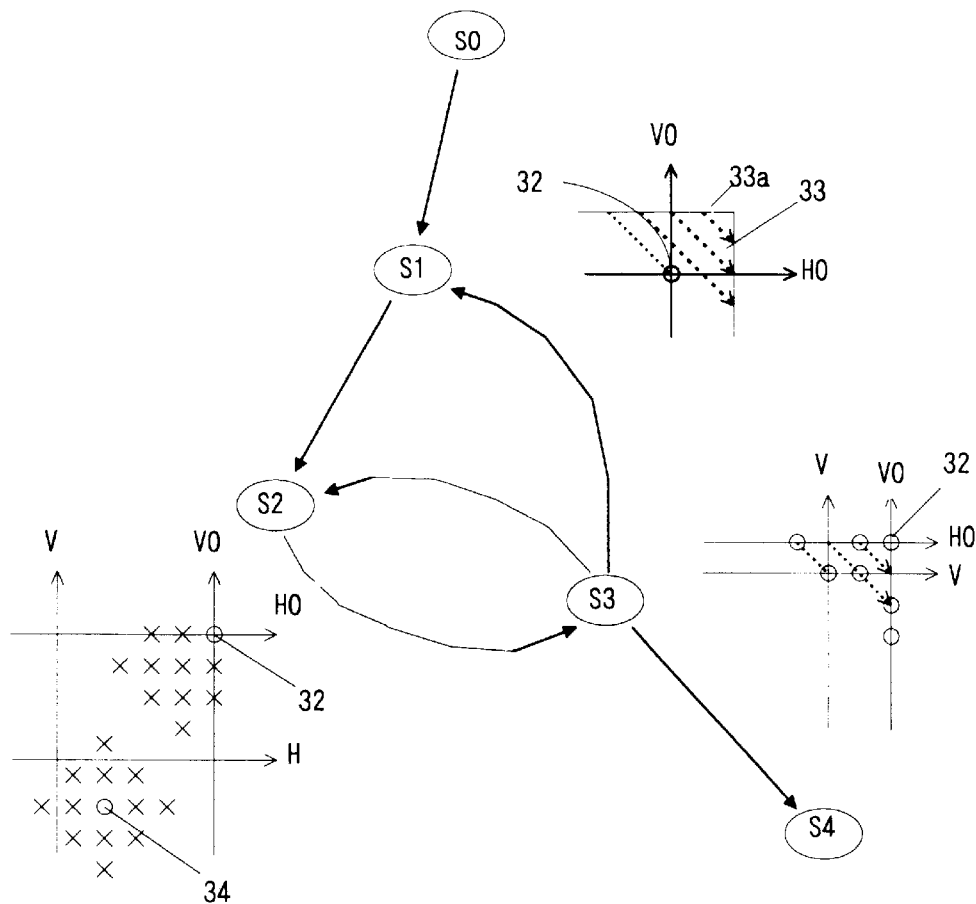
FIG. 5 is a state diagram showing process stages of the invention.
Figure 19:
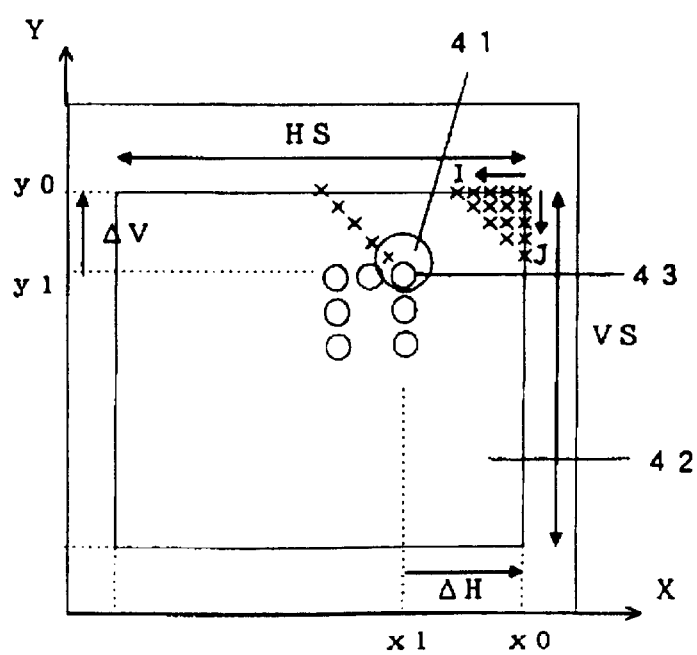
FIG. 19 illustrates extraction of a core electrode.

Referring to FIG. 5 showing a state diagram, a core electrode 32 is searched out by sweeping a search area 33 from a corner 33a in the triangle sweep mode. In FIG. 19, ball electrodes are extracted as searching is expanded from the upper right corner of a search area in a triangle shape, and a core electrode 43 is extracted when a window reaches the position 41.

Production of an Electrode Map Coordinate

Figure 16:
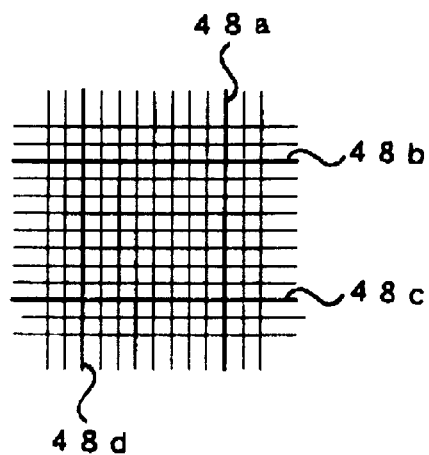
FIG. 16 illustrates sub-pixel coordinates to represent coordinate values.
Figure 20:
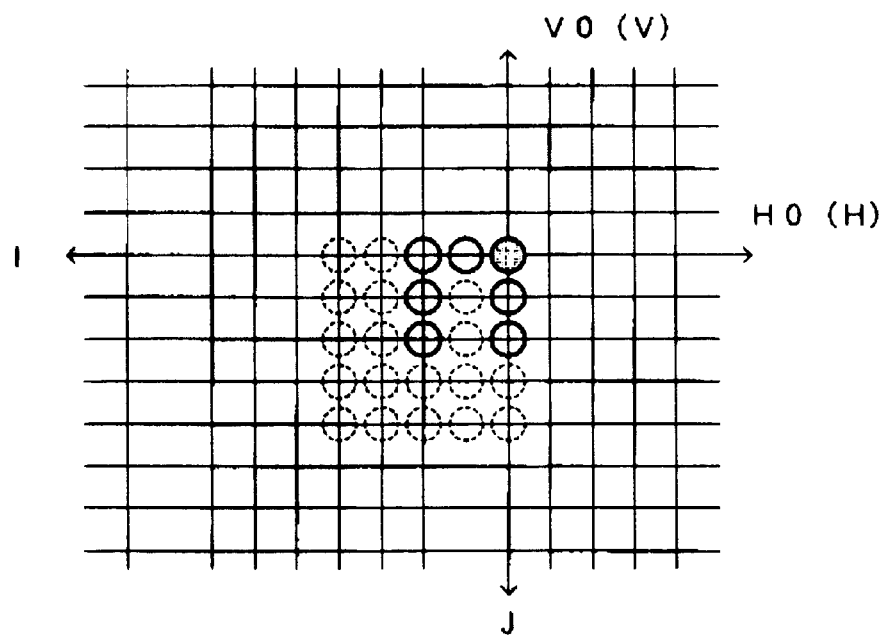
FIG. 20 illustrates an initial electrode map coordinate system produced when a core electrode is extracted.

After finding a core electrode, the process proceeds to step S27 in FIG. 4 to produce an electrode map and a triangulation network at a neighbor electrode observing state (step S27, and state S2 in FIG. 5). The electrode map is produced, as shown in FIGS. 5 and 20, by pasting an initial electrode map coordinate system (H0 V0), with the extracted core electrode set as its origin. This coordinate system H0V0 is a logical coordinate system having upper and lower limits, and its contents are image coordinates, radiuses (width), brightness, sizes, and so on of the 20 extracted electrodes. In FIG. 19, the image coordinate of the core electrode 43 is (x1, y1). Meanwhile, the center coordinate of a ball electrode and the top center coordinate of a leaded electrode are designated by a sub-pixel coordinate system shown in FIG. 16. The sub-pixel coordinate system is produced with the division of a pixel grid indicated by heavy lines 48a–48d in FIG. 16. The pixel grid in FIG. 16, for example, is divided into 8 sub-pixels. Since the sub-pixel coordinate system has a common origin with the image coordinate system, electrode coordinates will be hereinafter represented by image coordinate values.

The initial electrode map coordinate system has the upper and lower limits as described above. Referring to FIG. 19, HS and VS respectively represent equivalent ball numbers at X and Y axes of the search area, and displacements ΔH, ΔV in ball number are obtained from the drawing, then the upper limit of the coordinate H0V0 is (ΔH, ΔV), and the lower limit is represented by (ΔH−HS+1, ΔV−VS+1). It is a necessary feature for speedy processing that the initial electrode map coordinate system has a limited area.

In FIG. 20, an electrode map coordinate system (HV) is prepared, having the common origin with the initial electrode map coordinate system. The system HV is a virtual coordinate system connected with the original coordinate system H0V0 by a coupling vector (0, 0).

After extracting the core electrode, a certain area neighboring the origin is searched in a negative direction on the initial electrode map coordinate system shown in FIG. 20. The searching size is a constant, for example, neighbor radius=4 in FIG. 20, and 5×5=25 balls are searched. At this time, sequence to search the balls is important. Here, the corner rectangle sweep mode shown in FIG. 9(B) is employed as search sequence to generate coordinates. This sweep mode generates first (0,0), thereafter does each grid coordinate as the sweep advances further from the origin as indicated by arrows.

Coordinate Prediction

After extracting the core electrode, neighboring electrodes are extracted with a window placed to a predicted area by the coordinate prediction section 19. For this purpose, the section 19 predicts a physical coordinate relative to the specified electrode logical coordinate, from the logical coordinates and the physical coordinates of the previously extracted electrodes, so as to produce a predicted area. This situation is illustrated in FIGS. 23(A) and (B).

Figure 23:
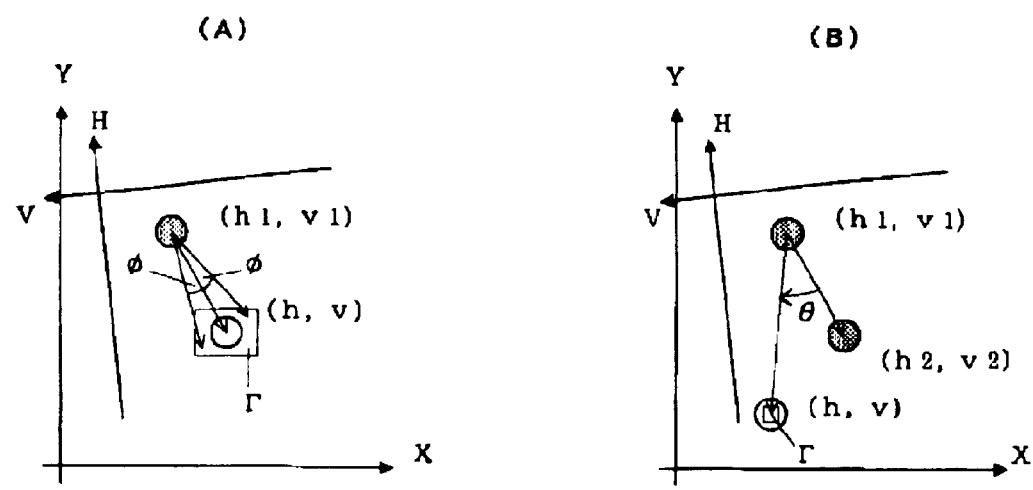
FIG. 23 illustrates prediction of area of other electrode from extracted electrodes; (A) shows the prediction from an existing electrode, and (B) shows the prediction from two or more existing electrodes.

FIG. 23(A) illustrates the case that the number of existing electrodes is one when the HV coordinate system is implemented. This situation occurs right after the extraction of the core electrode. If the existing electrode logical coordinate is represented by (h 1, v 1) and the predicted electrode by (h, v), then the logical distance, namely, the difference (h−h1, v−v1) multiplied by the ball distance (ΔH, ΔV) results in a physical (image) distance. As shown in FIG. 6, the ball distances ΔH and ΔV generally differs a little bit at the H and V axes. This physical vector is rotated by 90° with HV axes on the XY coordinate system. Additionally, the vector is swung right and left by a maximum orientation deviation φ of the vacuum nozzle. Further adding an uncertain distance ε so called in the invention (not shown in the drawing), a final expanded area Γ is figured out as a predicted area. The uncertain distance ε brings a margin for the prediction, and it is preferable to depend on an electrode diameter. For instance, ε=(⅓)*(ball radius) for ball electrodes, and ε=(⅛)*(lead width) for leaded electrodes, are given. The deviation φ is generally less than 5° in actual mounting operation.

FIG. 23(B) illustrates the case that the number of existing electrodes is more than two. This situation normally occurs. If the logical coordinates of the existing electrodes are represented by (h1, v1) and (h2, v2) and the predicted electrode by (h, v), then the logical distance, namely, the difference (h2−h1, v2−v1) multiplied by the ball distance (ΔH, ΔV) results in a physical (image) distance between the two electrodes. Similarly, the difference (h−h1, v−v1) is multiplied by the ball distance (ΔH, ΔV).

From the above two distances, the angle 0 between the two vectors (directed from the vector for the existing electrodes to the unknown vector; negative value in the drawing) and its length ratio (length for the existing electrodes to denominator, and the unknown one to numerator; larger than 1 in the drawing) are calculated. Representing the difference between the physical coordinates for the existing electrodes by (p2−p1, q2−q1), this vector is first rotated by θ, next multiplied by the length ratio (reverse order is acceptable), and then added the physical coordinate of the electrode (h1, v1) thereto, so as to produce a coordinate so-called prediction center. Adding the uncertain distance ε (not shown in the drawing) for expanding the area as in the case of one existing electrode, it results in a final predicted area Γ. At this time, the area is expanded by the length ratio when the ratio is larger than 1, or added by ε when the ratio is less than 1. In FIG. 23(B), the existing electrodes used for predicting the electrode (h, v) are preferably selected from electrodes neighboring (h, v) by a spiral sweep mode.

The spiral sweep mode is generated by the spiral sweeping section 29 as shown in FIG. 9(C). The sweeping section 29 is means for generating grid coordinates starting from the designated coordinate (i0, j0), next (i0+1, j0) and successive grid coordinates along the arrows far away as indicated. A region for the spiral to be generated is represented by four coordinates, imax, imin, jmax and jmin. When predicting the electrode (h, v), it is positioned as the center of the spiral, and the region is set to the upper and the lower limits of the electrode map. The prediction is usually executed using two more existing electrodes.

As described later, when there exist two more triangulation points lit by the triangulation point generation means 22, the coordinates of the lit points are used for the prediction. Since a triangulation point coordinate neighboring the electrode (h, v) is known, two lit triangulation points will be obtained by sweeping the neighbor of the triangulation point by the spiral sweep mode as described above. Use of the coordinates of the two triangulation points can produce a predicted area similarly as in FIG. 23(B).

Generation of Windows (Ball Window)

Figure 25:
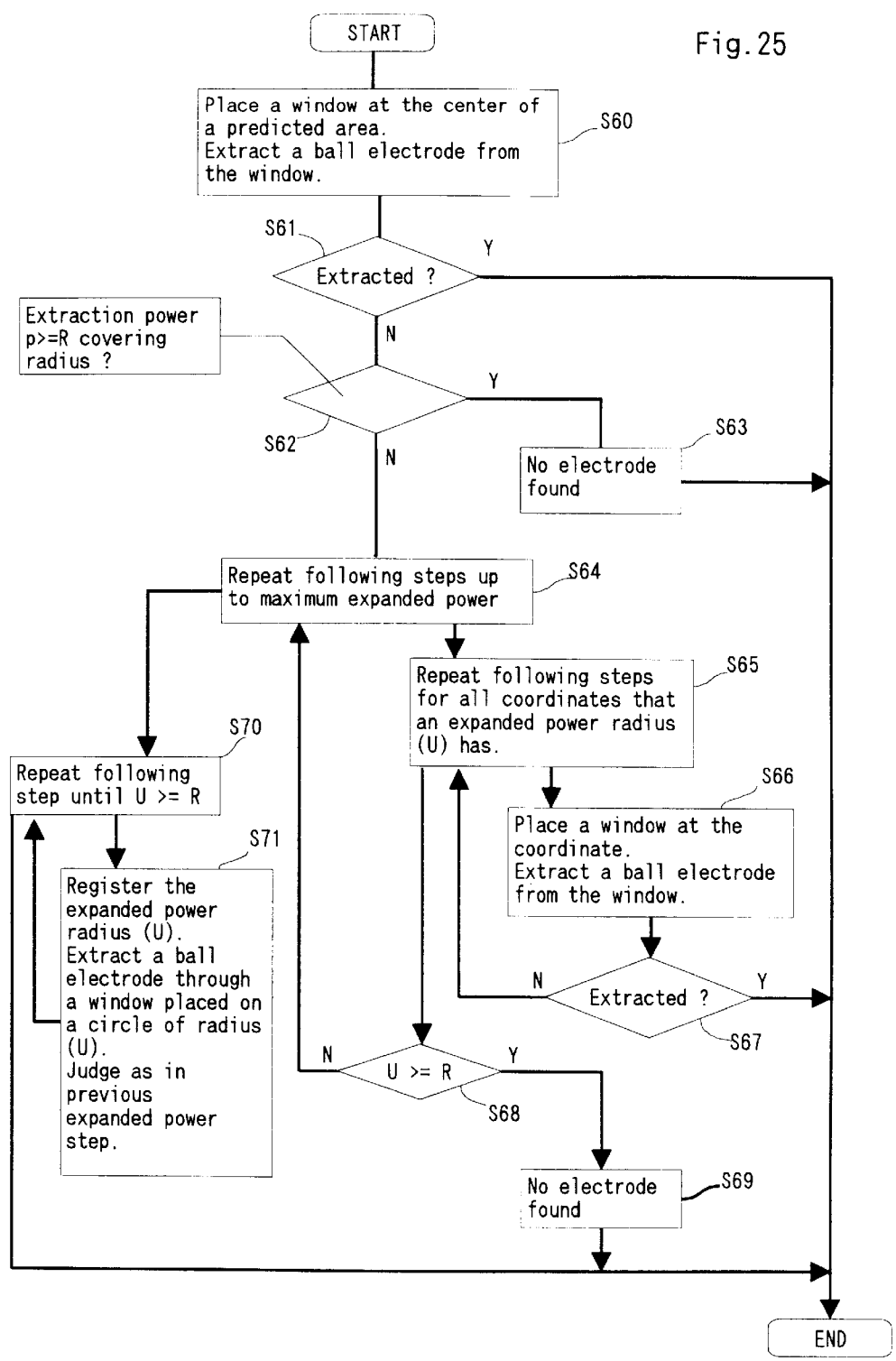
FIG. 25 is a flowchart showing the generation of ball windows in the predicted area.

After predicting a coordinate on the HV coordinate system, a window is generated to cover the predicted area including a ball image on the XY coordinate system. A ball window or a lead window is generated according as a target component is a BGA or leaded component. The ball window is generated by the ball generation section 20 when recognizing a BGA component, so as to cover the predicted area of the center of electrode to be extracted. FIGS. 24(A) and (B) illustrate generation of a ball window, and FIG. 25 is its flowchart.

As shown in FIG. 24(A), the generated window has a circle of radius ρ called extraction power. When a circle 53 having the radius ρ is drawn at the window center, a ball image 54 having the center within the circle 53 is always extracted. In this example, ρ=√3/2×(ball radius) is set, but this value is not always limited thereto. However, when this value is adopted, cutting line lengths of the ball 54 cut by axes passing through the center of the window are larger than the ball radius, whereby acceptability of a ball can be checked in earlier step, which is preferable to high-speed processing.

FIG. 24(B) shows a locus of generating windows. First, it is tried to extract a ball electrode by placing the window at the center of the predicted area at step S60 in FIG. 25. In FIG. 24(B), circles having the extraction power ρ are shown by thin dotted lines. At step S61, it is checked whether the ball electrode is extracted from the window. If extracted, the process ends.

If not extracted, the window is moved in succession following the arrows as indicated, to extract a ball electrode. Circular plates of radius ρ are covering the plane. At this time, the window moves on circles of stepped expanded extraction power ρ, as explained in the following. The heavy dotted line (a covering radius R) in FIG. 24(B) indicates a minimum circle to enclose the rectangular predicted area of the electrode center (FIGS. 23(A) and (B)). If an electrode is not extracted even when the window moves to a position 51, then the process ends with the decision of no electrode (steps S62 and S63).

If the power ρ is smaller than the covering radius R, the power ρ is expanded (the expanded power ρ is put as U) for the window to move on the stepped expanded circles with the same process repeated (step S65). The window tries to extract a ball electrode at step S66, and the process proceeds to step S67 to check whether a ball is extracted. If extracted, then the process ends. If not extracted, the process is repeated for all coordinates that U has.

It is checked at step S68 whether the expanded power U is larger than the covering radius R. If U≧R, then the extraction process ends with the decision of no electrode (step S69). If U<R, the process advances to step S70 via step S64, so as to repeat the process until it reaches U≧R. In this case, as shown in step S71, the power U is registered with expansion as described below, to extract a ball as the window moves on the circles of the power U.

Referring to FIG. 24(B), the window at position 50 is a last window on the circle of a first step of expanded extraction power. The window at position 51 is a last window on the circle of a second step of power further expanded from the first step of power. Similarly, the circle of power continues to expand. However, the process, in most actual cases, ends at the first step of expansion. Therefore, it is practically sufficient to prepare four steps of expansions for the execution of the invention. In this example, the process is enhanced with increment constants as described below.

| | |
|---|---|
| Radius increment ratio (to the ρ) for the first step | 0.732 |
| Radius increment ratio (to the ρ) for the second step | 0.775 |
| Radius increment ratio (to the ρ) for the third step | 0.819 |
| Radius increment ratio (to the ρ) for the fourth step | 0.866 |

The radius increment ratio for the first step in the above example is calculated as follows: assuming six circles of radius 1 aligned with equal distance on a circle of radius 1, since a cross point of two circles of radius 1 adjacent each other corresponds to an expanded point of the power, (distance between the predicted center and the cross point= √3/2×2)−1 (original radius) approximately equals to 0.732. For the fourth step; since the fourth step of line lies further outside of the third step, shown by a position 52 in FIG. 24(B), assuming circles of radius 1 aligned with distance 1 on a straight line, a cross point of two circles adjacent to each other, which is an expanded power, is apart from the straight line by √3/2, approximately 0.866. The radius increment ratio for the second and third steps are calculated as interior division values between the first and fourth steps of increment ratios.

With sequential generation of windows by the process described above, it is checked whether a ball electrode resides in the predicted area.

Generation of Windows (Lead Window)

In case of a leaded component, the lead window generation section 21 generates a lead window sequentially to cover the predicted area for the top of a leaded electrode. FIGS. 26(A) and (B) illustrate generation of lead windows, and FIG. 27 is its flowchart.

The lead window has an area 60 called extraction power, as shown in FIG. 26(A), which is a small area of 2P×2L. A lead image 61, the top of which locates in the area 60, is always extracted. The size of the area varies according to lead shape in this example.

FIG. 26(B) shows a locus of the extraction power. First at step S80 in FIG. 27, extraction of the lead is executed by positioning the window so that the center of the predicted area coincides with the center of the extraction power. With this, the center coordinate of the window is generally displaced in a lead direction by Pcenter as indicated in FIG. 26(A). In FIG. 26(B), the extraction power, which is an area composed of pitch length 2P and lead length 2L, is shown by dotted lines.

Figure 27:
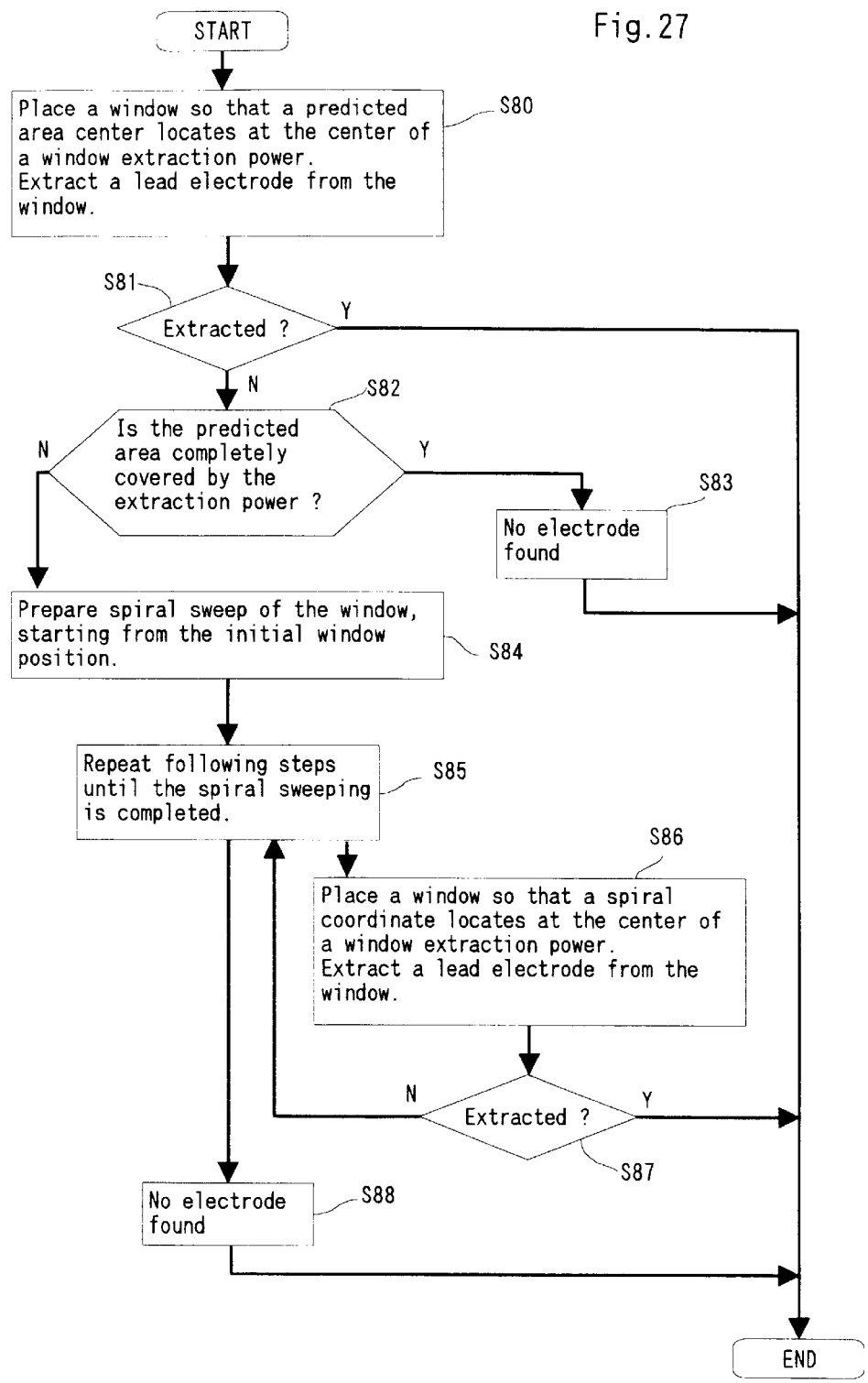
FIG. 27 is a flowchart showing the generation of lead windows in the predicted area.

At step S81 in FIG. 27, it is checked whether the leaded electrode is extracted. If extracted, the process ends. If not extracted, the window is, for extracting the electrode, serially moved along the arrows in FIG. 26(B) so as to cover a plane by the rectangle of 2P×2L. A heavy dotted line indicates the rectangular predicted area for the lead top. Since this area is to be covered by limited number of powers after all, if the electrode is not extracted even at the last step of power, the process goes to end at step S88 with the decision of no electrode. In the case that the predicted area is small enough to be covered by the first power, existence of an electrode can be judged at the first step (step S82). A description hereunder assumes a wide prediction area that one or both directions of it exceeds the power, then a spiral sweep mode is prepared by placing the initial window as its center.

Referring to FIG. 26(B), a number of the power "a", which is generated at one side of coverage from the predicted center to the end of the predicted area in the pitch direction, is so calculated that the length Cpitch/2 is covered by a segment 2P with some overlap. There exist "a" pieces of the power at both right and left sides. In a similar manner, a number of power "b" is calculated at one side in the lead direction. Either "a" or "b" is sometimes "0" (but not both). In order to generate each coordinate of the center of the power, the spiral sweep mode shown in FIG. 9(C) is applied. A chain of coordinates of the powers in FIG. 26(B) are output as (i, j), putting the number "a" to imin and imax, and the number "b" to jmin and jmax.

The lead extraction from the window is executed by the spiral sweep as described above, repeating steps S85 and S86. If a lead is extracted at step S87, then the process ends. If not extracted, the process loops back to the S85 until the spiral sweep ends. If not extracted by the end of the sweep, then the process ends with decision of no electrode at step S88.

With sequential generation of lead windows by the process described above, it is checked whether a leaded electrode resides in the predicted area.

Generation of Triangulation Points

Figure 28:
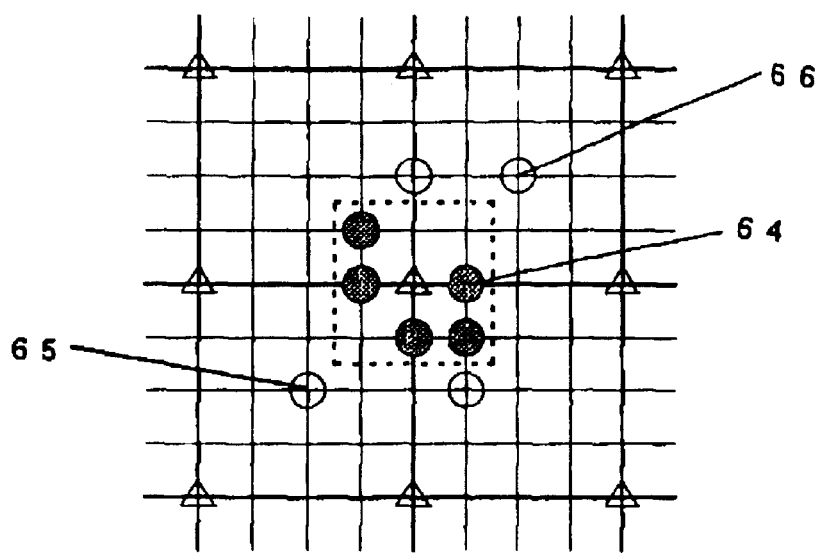
FIG. 28 illustrates generation of triangulation points.

When predicting coordinates as described before, generation of triangulation points helps the prediction precision to be improved. The triangulation point generation section 22 generates triangulation points as preferable datum points on a grid for extracted electrodes. FIG. 28 shows a part of a triangulation network, and marks Δ represent the triangulation points, which are controlled by logical coordinates, and a logical distance between adjacent points is 1 as indicated by heavy lines in the drawing. The origin (0,0) of the triangulation point coordinate system coincides with the origin (0,0) of the initial electrode map coordinate system H0V0 in FIG. 20. The points are disposed every certain number of electrodes counting from the origin of the H0V0 system.

In FIG. 28, the points are disposed every 4 electrodes on the H0V0 system, but this number is not limited to this example. In the example of FIG. 28, each triangulation point stands for 2-neighbor electrodes. 0-neighbor electrode means the triangulation point itself, and 1-neighbor electrodes are enclosed by a dotted line counting to 8 coordinates. 2-neighbor electrodes locate at its outside counting 16 coordinates. After obtaining a core electrode, the triangulation coordinate system is set at the same time as the initial electrode map coordinate system is provided. The two coordinate systems overlap each other, thereby having upper and lower limits. Right after the coordinate systems are provided, all triangulation points other than the origin are initialized, thereby having no electrode. Only the origin point has the coordinate of the core electrode and its threshold value.

As the extraction of electrodes advances, the extracted electrodes are registered with respect to the triangulation point to control them, every time an electrode is detected. FIG. 28 shows the state that the fifth electrode 64 has been additionally registered as 1-neighbor to the center triangulation point having 4 1-neighbor electrodes. Since, in the example of FIG. 28, the triangulation point is controlled to be turned on as a datum point when total 5 electrodes are detected including 0- and 1-neighbor, the point starts lightening upon addition of the fifth electrode 64.

A process of deciding the coordinate of the triangulation point will be explained below. First, 5 pairs of electrodes are chosen from the 5 1-neighbor electrodes to predict the coordinate of the point, the 5 pairs being composed of, in registration sequence, the $1^{st}$ and $2^{nd}$, $2^{nd}$ and $3^{rd}$, $3^{rd}$ and $4^{th}$, $4^{th}$ and $5^{th}$, and $5^{th}$ and $1^{st}$ electrodes. The means illustrated in FIG. 23(B) is employed for the prediction. The 5 times of predicted coordinates are recorded. In case that the point itself is an electrode, looking the point itself as one predicted coordinate, 4 times of predictions by 4 pairs other than the point are carried out.

If there exist two more 2-neighbor electrodes, coordinates of farthest two electrodes 65 and 66 in FIG. 28 are chosen for prediction of the triangulation point. Since 6 predicted coordinates are obtained, a mean value of 6 coordinates results in the coordinate of the triangulation point.

Using triangulation points generated as described above, the predicted physical coordinates can be obtained with higher precision.

Extraction of an Electrode (Ball Electrode)

Figure 29:
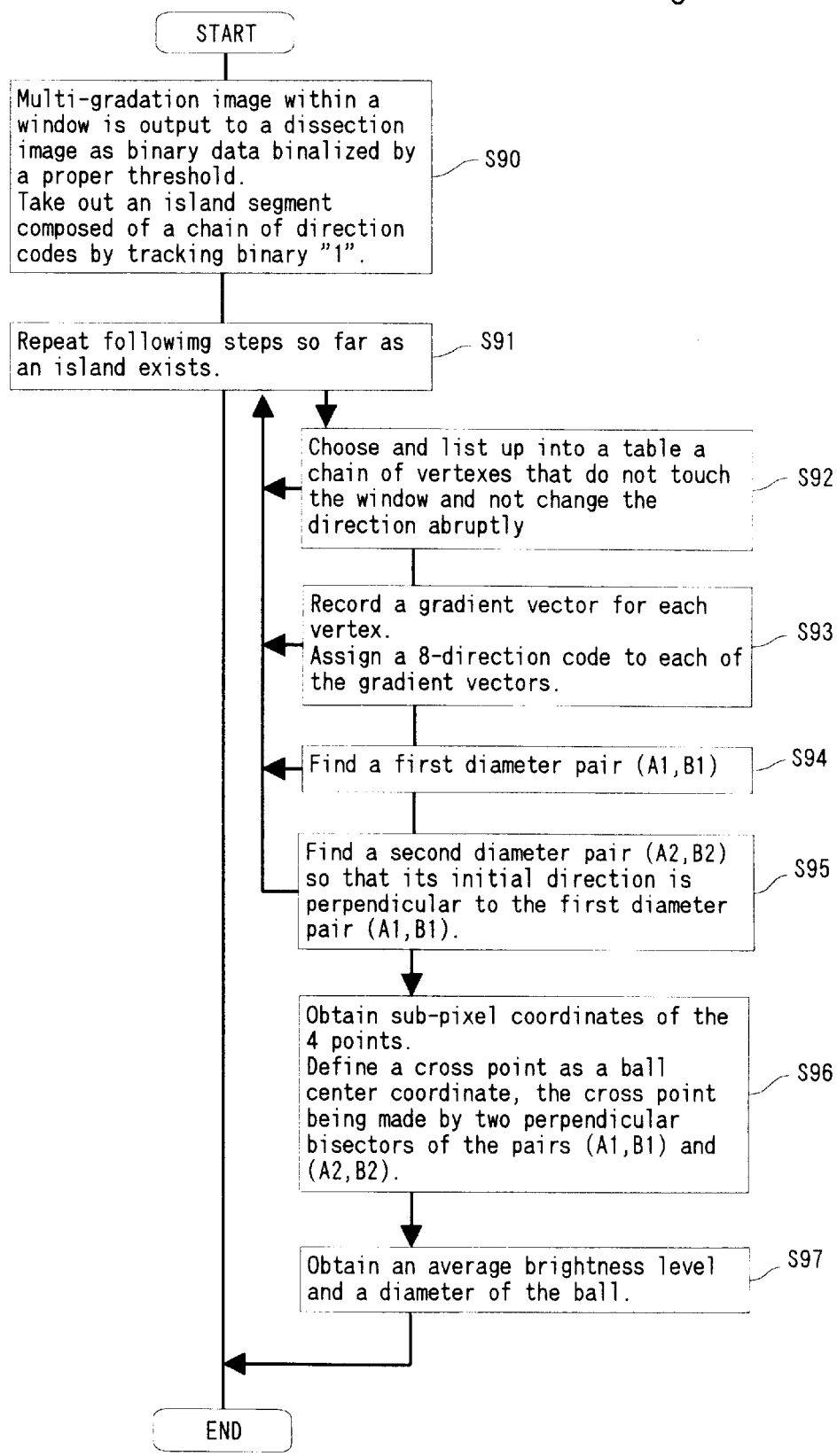
FIG. 29 is a flowchart for extracting a ball electrode and determination of its coordinate.

Through a window positioned in the image with respect to a predicted area, an actual electrode is extracted and also its coordinate is obtained. FIG. 29 is a flowchart for recognizing a BGA component by means of the ball extraction section 25, and FIG. 30 illustrates extraction of a ball window.

Figure 30:
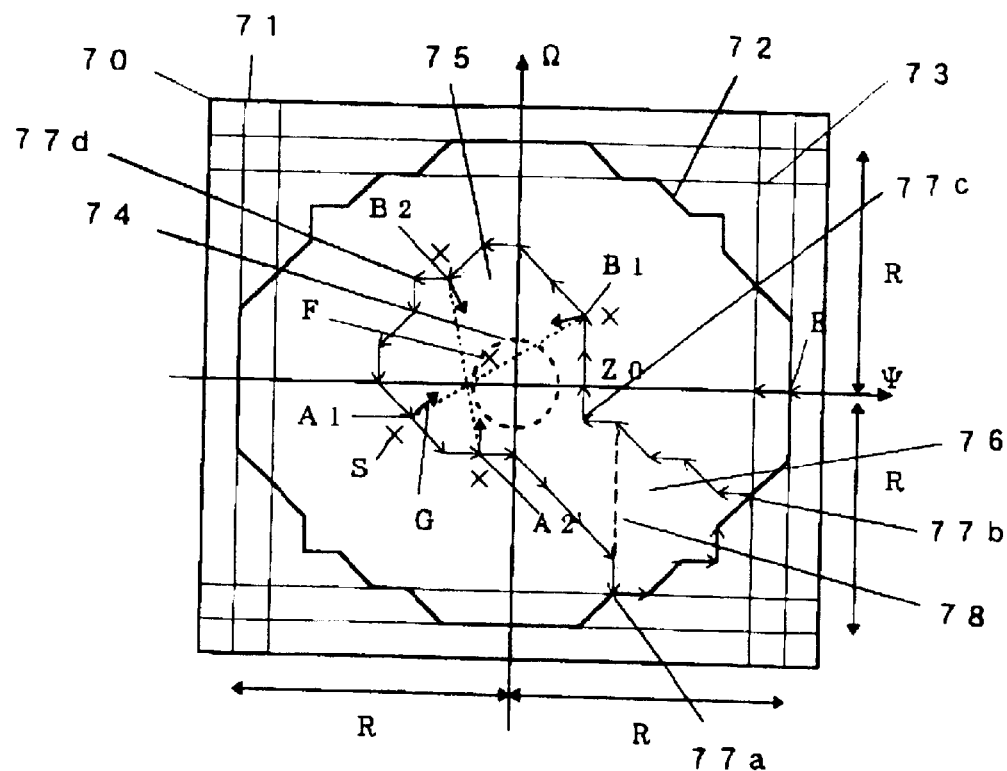
FIG. 30 illustrates the extraction of the ball electrode and finding of its coordinate.

FIG. 30 shows a dissection image 70, which is a small image depicted by binary values and stored to a different area from the input image. The image 70 has a window of the radius R in size, and has the number of pixels 2 (R+1)+1=2R+3 in both vertical and horizontal directions. Since 2R+3 is an odd number, one pixel exists at the center of the dissection image. Each grid point 71 corresponds to a pixel of the dissection image, and a dissection image coordinate system ΨΩ is parallel with the input image coordinate system XY. The center pixel 45 of the window 44 in FIG. 22(A) corresponds to the origin of the ΨΩ coordinate system. A ball window is logically a circle but is a path 72 in the dissection image as shown in FIG. 30. The reason is that the window path 72 is composed of direction codes 0–7 shown in FIG. 31. Since the window path is determined by the radius R, the window 72 is generated immediately in this example with the use of a table having a chain of direction codes previously calculated for all R within an area to be processed. Meanwhile, all pixels 73 outside the window 72 have flags to keep out.

Ball extraction begins at step S90 in FIG. 29, where a multi-gradation image within the window is output to the dissection image as binary data binarized by a proper threshold. The threshold for binarization is directed by an operator. On the other hand, the threshold can be determined automatically as follows. Choosing some origin neighbor 74 pixels (9, for example), a maximum brightness level is denoted by "a", out of corresponding input image (neighboring the pixel 45 in FIG. 22(A)) brightness. Also choosing some pixels (8, for example) on the window path 72, a minimum brightness level is denoted by "b", out of corresponding input image brightness (on the path 44 in FIG. 22(A)). If a<C1*b (where C1 is a contrast ratio constant, for example 1.2), then it is determined that there is no electrode. If not, then a threshold is defined to an interior division of a and b by ratio M:N (M=3, N=1, for example), that is, the threshold=(Na+Mb)/(M+N). However, if this value exceeds a limited upper or lower value, then it will be replaced to the limited value. If adapted such automatically calculated threshold, each window is binarized by a suitable value, whereby reliable extraction of electrodes can be achieved even for an image having biased brightness due to uneven illumination.

The Ψ axis, the Ω axis, the window path and inside the window are sequentially binarized by the threshold value obtained as described above. At the time of binarization on the axis, the starting end and the last end of "1" are caught. If the length between the ends is less than the ball radius, it is determined that there exists no electrode (refer to FIG. 24(A)). For the Ω axis, it is the same. When binarizing the window path, there exists no electrode if the total number of 1's exceeds a certain number (for example, ⅗ of pixel number of the path).

Meanwhile, advancing pixel by pixel in a negative direction on the Ψ axis, starting from a pixel E in FIG. 30, when "1" is detected, a chain of vectors (direction codes) enclosed by "1" so-called "island data", is produced. This production depends on a well-known method. It depends on a principle that, when seeking a chain of direction codes counterclockwise in an arrow direction around a binary substance 80 in FIG. 32(A), advancement along the "1" wall with left hand makes returning back to the starting point after all. FIG. 32(B), for example, represents the motion of inside the circle 81 in FIG. 32(A); the center indicates the current position (pixel). With respect to a current upward movement, directions 7, 0, 1, - - -, 5 are checked in this order. When "1" is first found (direction 3 in FIG. 32(B)), it is a next movement direction. After producing an island, the same process is repeated, advancing further beyond the island in the negative direction on the Ψ axis. Here, it is assumed that a lower limit of a perimeter length of the island is previously defined according to the ball size. It is enough to search the starting pixel of the island up to the origin of the ΨΩ coordinate system.

If there exists an electrode, one or more island data are generally obtained. At step S91, following process is repeated for all islands obtained before. But the process ends in the midst when the island is determined to a ball electrode.

Figures 32, 33:
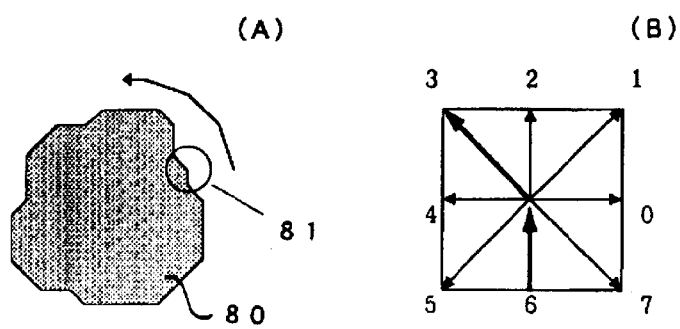
FIG. 32 illustrates the extraction of a ball electrode.
FIG. 33 is a table in which vertex coordinates, obtained at the time of extraction of a ball electrode, are stored.

Referring again to FIG. 30, it is assumed that the vector data for the island Z0—Z0 has been taken out. A portion 75 of the island Z0—Z0 corresponds to an electrode, and a portion 76 represents a foreign substance like a wire. A vertex table as shown in FIG. 33 is prepared from vertexes constituting the island data. At this time, such chain of vertexes are chosen and tabled that do not touch the window and do not change direction abruptly (step S92). Since the ball portion, for example, should not touch the window, vertexes touching the window 77a–77b are not chosen. A vertex 77c is not chosen either, because the direction is abruptly changed by more than 90°. However, a vertex 77d, which changes its direction by 90° counterclockwise, is selected. Vertex coordinates thus obtained are recorded at a column "vertex coordinate" with "vertex number" in FIG. 33. Here, the vertex coordinates are on the ΨΩ coordinate system.

At step S93, brightness gradient vectors are recorded, and their 8-direction codes are assigned on the table in FIG. 33. The gradient vector at the island Z0—Z0 is a vector that indicates the direction of image brightness change. A vector G in FIG. 30, for example, is a gradient vector at a vertex A1. The gradient vector is obtained by a known method. Vectors (1, 0) (1, 1) - - - (1, –1) are respectively assigned to the direction codes 0–7 shown in FIG. 31. Getting the product of each vector and its brightness change, the summation of the products for 8 directions results in the gradient vector. The gradient vector directs to higher brightness level from lower one, and its magnitude becomes larger as brightness difference increases. It is confirmed that gradient vectors substantially direct toward the ball center, as shown in FIG. 30, in case the vectors are on the ball electrode boundary.

Figure 31:
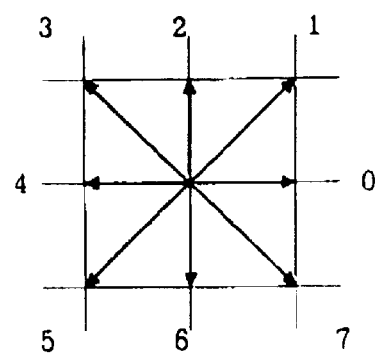
FIG. 31 shows direction codes used for the extraction of the ball electrode.

Meanwhile, the direction code in FIG. 33 comes from the directions 0–7 of FIG. 31 approximately classified to according to the direction of the gradient vector, and plays an important role in finding diameter pairs to reduce processing time.

Next, a first diameter pair in the island is found at step S94. Tracing the table in FIG. 33 from the vertex A1, a vertex B1 on the opposite side of the A1 is sought. For finding the B1, some features, such as distance, angle between both of the gradient vectors, etc., are checked.

A second diameter pair is similarly found at step S95. Rotating 90° counterclockwise the direction code (1, toward upper right in FIG. 31) of the vertex A1 shown in FIG. 30 as a starting direction (code 3 in FIG. 31), a vertex having the same direction (code 3) is searched. If not found the same direction vertex in the table, it is continued to search a vertex A2, including a next numbered direction (codes 2 or 4 in FIG. 31) and a second next numbered direction (codes 1 or 5). A vertex B2 on the opposite side of the A2 is similarly searched. For finding B2, the position and angle with respect to (A1, B1) are checked, in addition to the same features as in case of (A1, B1). For example, a dotted line 78 in FIG. 30 is not accepted.

Since the island is judged as a ball electrode at this time, the process advances to step S96 to detect the center coordinate of the electrode. First, four coordinates with respect to the two diameter pairs are produced as shadow coordinates. The shadow coordinate in FIG. 30 is a point S for the vertex A1. The shadow coordinate is a virtual coordinate designated by the sub-pixel coordinate shown in FIG. 16, having a threshold value itself located outside the binary vertex locus. It is assumed in FIG. 34(A), for example, that a pixel O is binary 1, both pixels P and R are binary 0. A pixel Q is not defined. Since a coordinate H on a vector (a, b) (a≧b≧0) is calculated by proportional allocation, the brightness level at the point H (lower than the threshold) is calculated with the brightness levels at the points P and R proportionally allocated by the coordinate H. Since the brightness at the point O is higher than the threshold, a position for the threshold locates in the midst of the points H and O. This position is T represented by a sub-pixel coordinate ($\mu 0$, $v0$), which is calculated by proportional allocation, in the direction of the vector (a, b). The limitation, a≧b≧0 in FIG. 34(A), makes the process simple. When a shadow coordinate for the point 0 in FIG. 34(B) is to be figured out, since the brightness becomes higher toward a direction G, the $\mu v$ coordinate system is pasted toward the (–G) direction by a rotating and turning operation. After finding the point T in FIG. 34(A), the T coordinate in FIG. 34(B) is obtained by following the reverse of the process described above.

Referring again back to FIG. 30, four shadow coordinates S indicated by marks x, named Sa1, Sb1, Sa2 and Sb2, are regarded as points on a circle. A perpendicular bisector to Sa1 and Sb1 is determined. Similarly, a perpendicular bisector to Sa2 and Sb2 is determined. A cross point of the two bisectors defines the coordinate F (center coordinate) of the ball electrode.

Thereafter, an average brightness level and a diameter of the ball are obtained at step S97.

Extraction of an Electrode (Lead Electrode)

Figure 35:
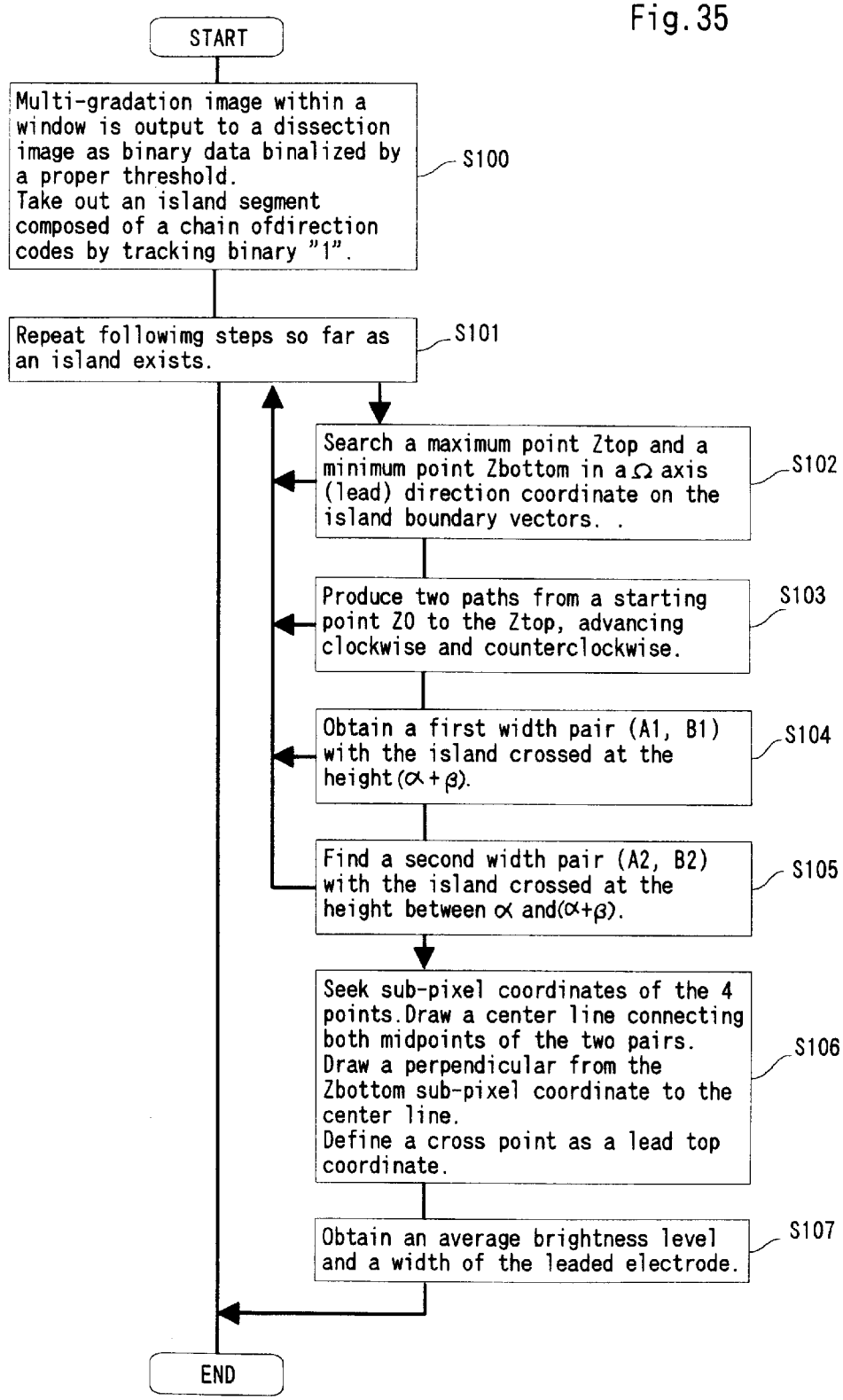
FIG. 35 is a flowchart explaining extraction of a leaded electrode and determination of its coordinate.

In case of lead electrodes, the lead extraction section 26 extracts an electrode. FIG. 35 is a flowchart for the extraction, and FIG. 36 illustrates the extraction of a lead electrode.

Figure 36:
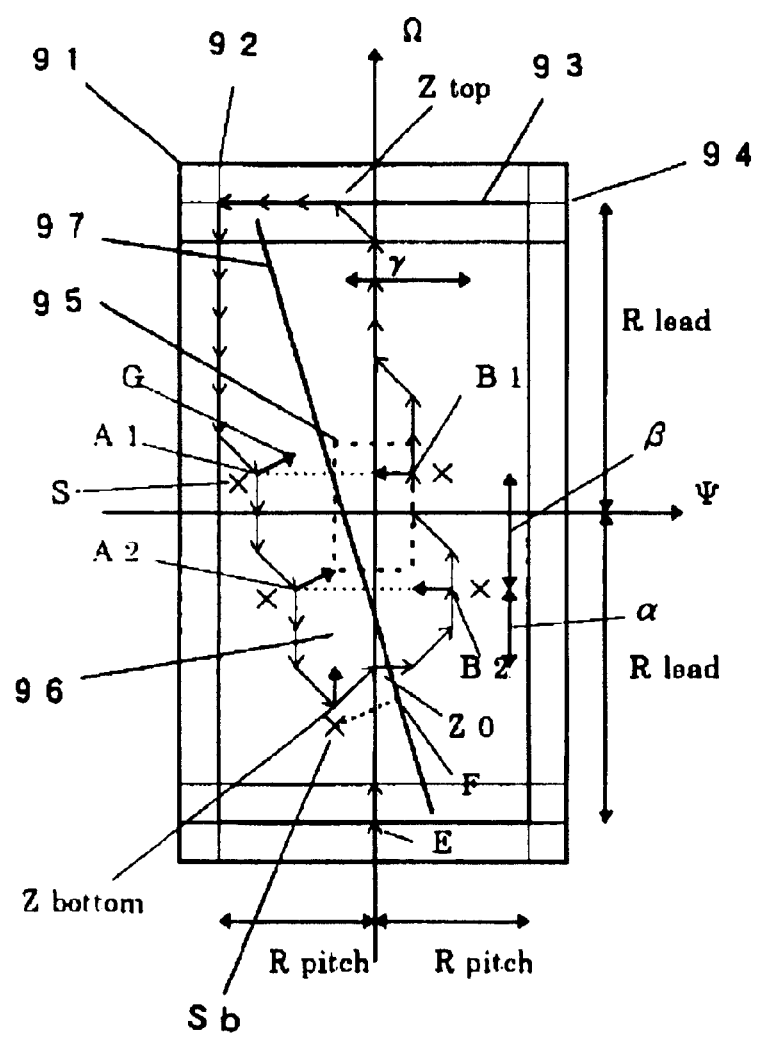
FIG. 36 illustrates the extraction of a leaded electrode and determination of its coordinate.

Referring to FIG. 36, numeral 91 denotes a dissection image, which is a small image depicted by binary values and stored to a different area from the input image. The vertical size of the image 91 is 2(Rlead+1)+1=2Rlead+3 pixels, where Rlead is a radius of a window 93 in a lead direction. The horizontal size is 2(Rpitch+1)+1=2Rpitch+3 pixels, where Rpitch is a window radius in a pitch direction. Since both pixel numbers are odd numbers, one pixel exists at the center of the dissection image. Each grid point 92 corresponds to a pixel of the dissection image. A dissection image coordinate system ΨΩ accords to one of the input image coordinate systems XY rotated by 90° multiplied by integer (0, 1, 2, 3) (refer to FIG. 8). The center pixel 47 of the window 46 in FIG. 22(B) coincides with the origin of the system ΨΩ. Meanwhile, all pixels 94 outside the window 93 have flags to keep out.

Lead extraction begins at step S100 in FIG. 35, where a multi-gradation image within the window is output to the dissection image as binary data binarized by a proper threshold. The threshold for binarization is directed by an operator. On the other hand, the threshold can be determined automatically as follows. Choosing some origin neighbor 95 pixels (9, for example), a maximum brightness level is denoted by "a", out of corresponding input image (neighboring the pixel 47 in FIG. 22(B)) brightness. Also choosing some pixels (8, for example) on the window path 93, a minimum brightness level is denoted by "b", out of corresponding input image brightness (on the path 46 in FIG. 22(B)). If a<C1*b (where C1 is a contrast ratio constant, for example 1.2), then it is determined there is no electrode. If not, then a threshold is defined to an interior division of a and b by ratio M:N (M=2, N=1, for example), that is, the threshold=(Na+Mb)/(M+N). However, if this value exceeds an upper or lower limited value, then it will be replaced to the limited value. If such automatically calculated threshold value is adapted, each window is binarized by a suitable value, whereby reliable extraction of electrodes can be achieved even for an image having biased brightness due to uneven illumination.

The Ψ axis, the Ω axis, the window path and inside the window are sequentially binarized by the threshold value obtained as described above. At the time of binarization on the Ψ axis, the starting end and the last end of "1" are caught. If the length between the ends is less than a lead width, it is determined that there exists no electrode. For the Ω axis, it is the same. Next, advancing pixel by pixel in a positive direction on the Ω axis, starting from a pixel E in FIG. 36, when "1" is detected, a chain of vectors (direction codes) enclosed by "1", so-called "island data", is produced. For detecting the island, the same method as described in the extraction of a ball electrode is applied. After producing an island, the same process is repeated advancing further beyond the island in the positive direction on the Ω axis. Here, it is assumed that a lower limit of a perimeter length of the island is previously defined according to the lead size. It is enough to search the starting pixel of the island up to the origin of the ΨΩ coordinate system.

If there exists an electrode, one or more island data are generally obtained. At step S101, the following process is repeated for all islands obtained before. But the process ends in the midst when the island is determined to be an electrode.

It is assumed in FIG. 36 that an island Z0—Z0 is obtained as a leaded electrode 96. A maximum point coordinate Ztop and a minimum point Zbottom in the Ω axis direction are searched at step S102 for checking a length. Next at step S103, two paths from the starting point Z0 to the Ztop are produced, advancing clockwise and counterclockwise. Here, it is assumed that an unstable range α, a stable range β at lead top area, and a lead width γ are given by the operator. And the two paths should not touch the window 93 up to the height (α+β) from Z0.

After finding a first width pair (A1, B1) with the island crossed at the height (α+β), the width is checked at step S104, and so is a smoothness of direction change at each point. Next at step S105, a second width pair (A2, B2) is found with the island crossed at the height α at step S105, and the width is checked, and so is a smoothness of direction change at each point. When the result is not acceptable, the same check is repeated, raising up a transverse line by one pixel until the line reaches the pair (A1, B1).

After detection of a leaded electrode, a center line of the lead is to be obtained at step S106. Shadow coordinates are produced with respect to the 4 points for 2 width pairs. The 4 coordinates are calculated by the same way as in the extraction of a ball electrode. The shadow coordinate for A1 is a point S in FIG. 36. 4 shadow coordinates marked by x (points S) are named Sa1, Sb1, Sa2 and Sb2. The lead center line 97 passes through both midpoints of Sa1, Sb1 and of Sa2, Sb2. After producing a shadow coordinate Sb for the Zbottom, a perpendicular is drawn onto the center line 97 from the point Sb. A drop point F in FIG. 36 defines the coordinate of the leaded electrode top end.

Thereafter, an average brightness level and a width of the leaded electrode are calculated at step S107.

Removal of Spurious Electrodes

Referring back to the general flowchart in FIG. 4, a core electrode is detected at step S26, an electrode map and a triangulation network are produced at step S27, and the process goes to the neighbor electrode observing state at step S28 (S2 in FIG. 5), in which it is determined whether an electrode exists by placing a window in the electrode prediction area so as to sequentially extract neighbor electrodes. In FIG. 5, the extracted electrodes neighboring the core electrode 32 are indicated by marks x. Here, numeral 34 denotes a spurious electrode. Since such spurious electrodes cause deterioration of the prediction precision of electrode positions, the spurious electrode removal section 23 removes the spurious electrodes with examination of the electrodes previously extracted.

In FIG. 37(A), for example, an extracted electrode 100 is obviously a spurious electrode (pseudo-electrode) because of its position displacement. It is judged to be a spurious electrode in this example if an electrode locates displaced over the ball radius from a preferable grid coordinate. Such electrodes have to be eliminated as early as possible, because they cause confusion in predicting the position of neighboring electrodes. Another reason for their elimination is that they also add to the count of mismatch times at the time of positioning collation.

An electrode 101 in FIG. 37(B) is distinctly a spurious electrode (pseudo-electrode), because its diameter is too small. It is also an element to be judged whether the brightness is too high or too low. The diameter (the width in case of a lead) and the brightness are hereinafter called electrode feature values. Average feature values are always controlled in this example. When either feature value for an electrode goes out of range of its mean value by ±40%, the electrode is determined to be a spurious one. Such spurious electrodes are generally displaced in their coordinates.

Figure 38:
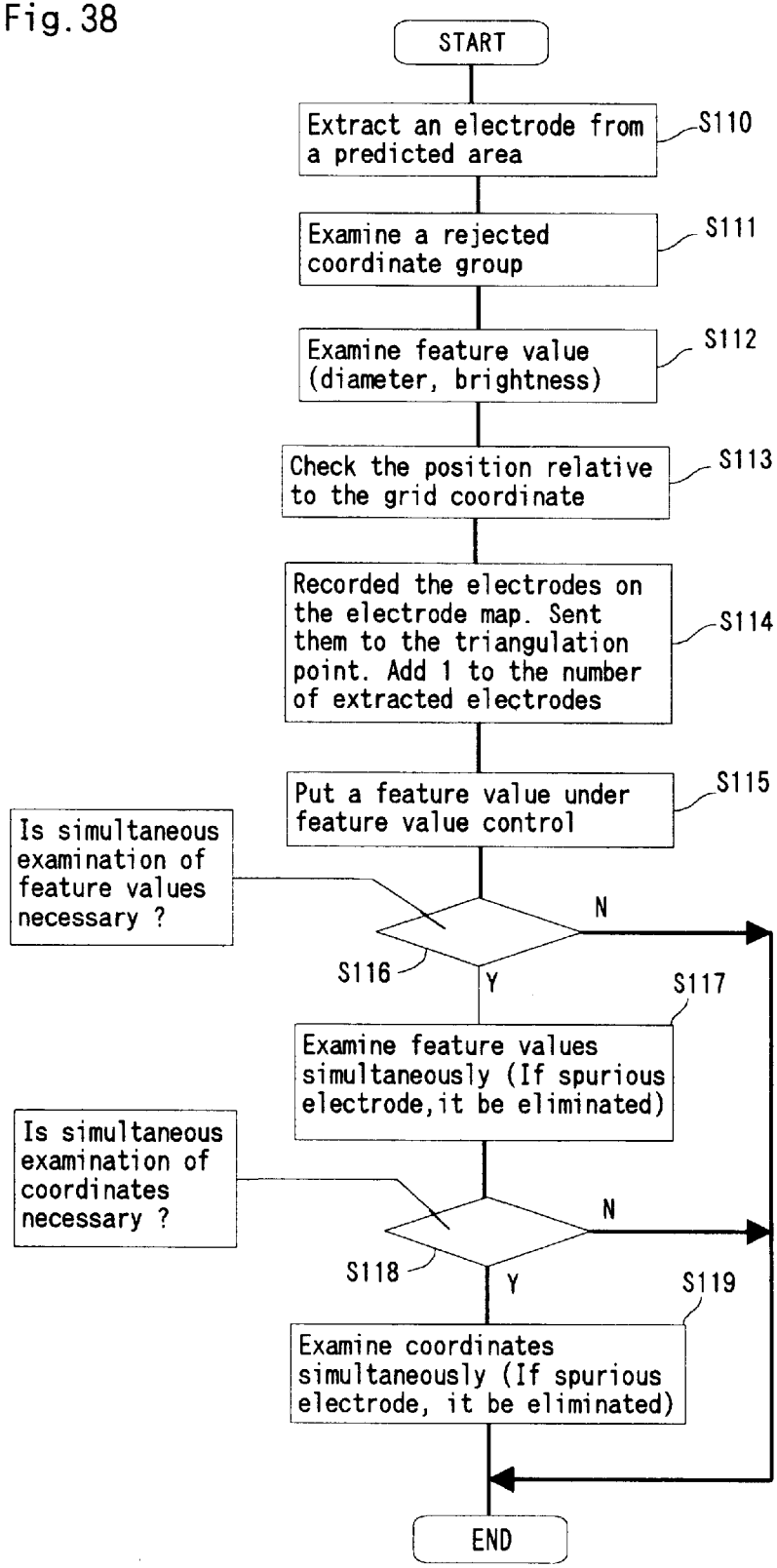
FIG. 38 is a flowchart showing removal of spurious electrodes.

FIG. 38 is a flowchart showing removal of spurious electrodes. First at step S110, each electrode is extracted from the coordinate prediction area, a rejected coordinate group (which will be explained later) is examined at step S111, the feature values are checked at step S112, and each position is checked relative to grid coordinate at step S113. When an electrode is extracted, it is recorded on the electrode map, sent to the triangulation point, and 1 is added to the number of extracted electrodes at step S114.

Figure 39:
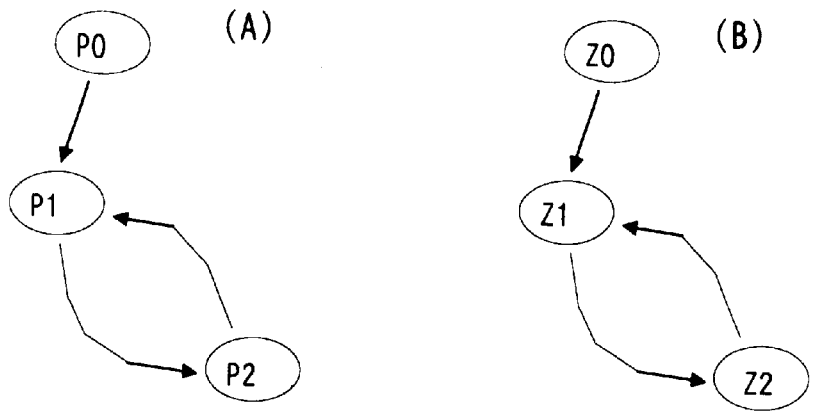
FIG. 39 illustrates state diagrams showing the spurious electrode removal process; (A) for electrode feature value, and (B) for electrode position.

A firstly extracted electrode or a plurality of previously extracted electrodes including the first one may happen to be spurious electrodes. Since there is not an average value at initial stage, the removal of the spurious electrode cannot be executed. Such a problem is solved using a state transition diagram. FIG. 39(A) shows a state diagram of the feature value, and FIG. 39(B) shows a state diagram of positions. As to the feature value, when a first electrode is extracted, the process advances to a state P1 with the number of electrode counted to 1. The feature value (diameter/brightness) of the core electrode is recorded to each specified location as a total. When a second electrode is extracted, its feature value is just added. After repeating the same addition, when a sixth electrode is extracted, its feature value is added to the sum total, and then an average value is calculated with the sum total divided by 6. The average diameter and the average brightness are reported. Demanding simultaneous examination, the process advances to a state P2. Every time an electrode is extracted, the average is renewed, staying at the state P2. On the other hand, when removal of an electrode is notified, the total sum is reduced by its feature value to renew the average value. If the number of electrodes is more than 6, the state is halted. If the number is reduced to 5 (never to less than 4), the state moves back to the P1. Thereafter the same transitions are repeated.

In case of the position state diagram, there is not a control value, but the state stays at a state Z1, if the number of electrodes is less than 8. When a eighth electrode is extracted, the state moves to a state Z2, demanding simultaneous examination. Even when an additional electrode is found, the state Z2 remains. But when removal of an electrode is notified, the state Z2 still remains if the number of electrodes is more than 8. If reduced to 7 (never to less than 6), the state moves back to the state Z1. Thereafter the same transitions are repeated.

With such a simple procedure, all spurious electrodes are eliminated. In other words, a spurious electrode is removed when the simultaneous examination is executed at the time of the transition from the state P1 (Z1) to the state P2 (Z2). (Note that the process is repeated until all spurious electrodes are removed). At the state P2 (Z2), a newly extracted electrode is examined prior to registration compared with the average value.

The above-described process is shown at steps S115 through S119.

Figure 40:
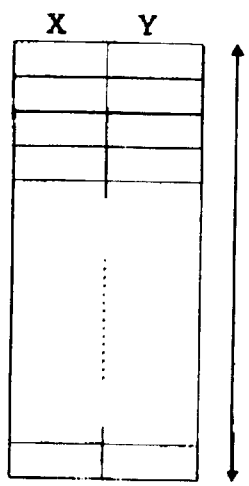
FIG. 40 shows a rejected coordinate group for use with the removal of spurious electrodes.

When a previously extracted electrode is removed, or a newly extracted electrode does not pass the prior examination, its coordinate is added to a series of XY coordinates shown in FIG. 40, which series is called the rejected coordinate group. This group is not initialized after it has been initialized at the initial state S0 in FIG. 5. That is, the group is increased only in its member, and prevents the previously removed spurious electrodes in the whole image area from being extracted again. In actual mounting operation, the number of spurious electrodes in an image are 20 at the most. Therefore, it is enough to save around 20 for the capacity indicated by an arrow in FIG. 40.

Here, the electrode numbers 6 or 8 adopted as a transition parameter in the above example are not an inevitable number.

Positioning of Electrodes

Referring back to FIG. 4, if a spurious electrode is found and eliminated at the neighbor electrode observing state (S2 in FIG. 5), the vacant electrode is initialized (step S29), origin neighbor electrodes in the initial electrode map are extracted (step S30), and the process moves to origin electrode examining state S3 if the extracted electrode has not been removed (step S3 1). At the state S3, first, a positioning evaluation table (which will be explained below) is initialized (step S32), some electrodes neighboring the core electrode 32, as shown in FIG. 5, are sequentially collated with the plurality of previously selected candidate electrodes, and the state goes to positioning completion state S4, if the extracted electrodes are judged to identify with the candidate electrodes. If neither candidate electrode accords with the core electrode 32, the state moves back to the state S1 presuming the core electrode to be a spurious electrode. If removal of a spurious electrode occurs, then the state S3 directly returns to the state S2. Electrodes neighboring the removed electrode 34 are again examined at the state S2. Electrodes (limited to necessary ones to be examined) neighboring the core electrode 32 are again extracted, and the state again goes to the state S3 with less spurious electrodes.

With the process described above, the process is sure to advance to the state S4 with either electrode neighboring the core electrode 32 being identified with a certain candidate. Here, the core electrode 32 is not always a real electrode.

A description will be given of the electrode positioning steps (steps S32 through S35) executed at the state transition from S3 to S4, with reference to a flowchart of FIG. 41. Tracing this flow, the electrode positioning section 24 in FIG. 3 finally determines the image coordinates of the object component electrodes from the extracted electrode pattern. First at step S120, a positioning evaluation table is initialized, and the allowable mismatch number is set to "e" previously obtained at step S22 of FIG. 4.

Figure 21:
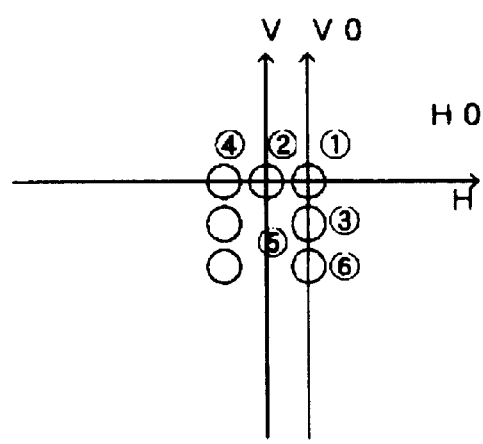
FIG. 21 is an electrode pattern showing extracted electrodes on an electrode map coordinate system.

At the state S3 in FIG. 5, the extracted electrodes are distributed at the origin neighbor of the initial electrode map coordinate system H0V0 (right after the detection of a core electrode) or at fairly vast area (after removing spurious electrodes). Since the candidate electrodes are still expected to reside at the H0V0 origin neighbor, it is enough to examine whether some origin neighbor electrodes identify with candidate electrodes. As the candidates are distributed in the corner triangle shape, the electrodes are searched in the corner triangle sweep mode in the negative direction from the origin of the initial electrode map coordinate system, so as to extract real electrodes according to their logical coordinates (step S121). The virtual electrode map is implemented with the origin moved in parallel onto the real electrode (offset operation) (step S122). Assuming that each candidate itself is located at the origin of the electrode map, the mismatch number is counted between logically predicted values (exist 1/vacant 0 on the defined electrode pattern as shown in FIG. 18) and actually observed values (exist 1/vacant 0 of electrodes on the electrode map as shown in FIG. 20 or FIG. 21), and the mismatch number is recorded in the positioning evaluation table (step S123). At this time, it is favorable for speedy examination to pay attention to the minimum mismatch number in every offset operation. The initial minimum value of "e" is the allowable mismatch number set before.

The first cycle of collating examination is executed with this value as an upper value. If the candidate is alive, that is, if the candidate counts a mismatch number less than the value e, the value e is replaced with the observed minimum mismatch number as the upper value for next cycle of examination (step S124). This process is based on a principle that right collating is a collating with a minimum mismatch number. As the cycle is repeated, the value e monotonically decreases, which accelerates candidate death, allowing speedy positioning.

Meanwhile, the number of the offset at the time of positioning is arbitrary, but it is natural to set the number nearly equal to the number of candidates. During the positioning process, electrodes are sometimes extracted from the image with respect to logical points, not previously examined, on the HV coordinate system. The examination order is not always regular, but determined according to the electrode map and the defined pattern.

Figure 41:
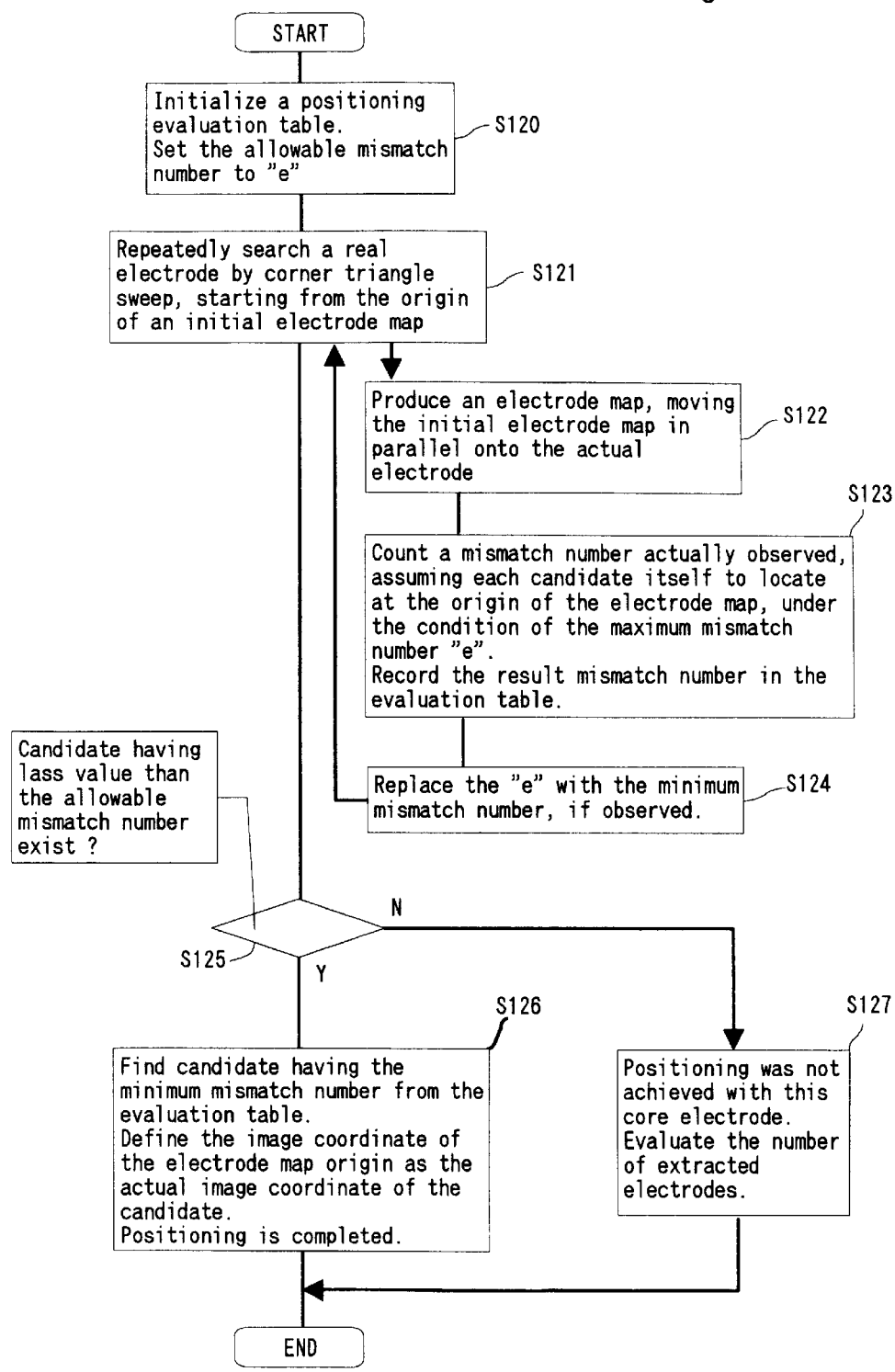
FIG. 41 is a flowchart explaining positioning of electrodes.

Step S125 in FIG. 41 checks whether candidate electrodes having a value lower than the allowable mismatch number reside. If yes, candidate electrodes having the minimum value are found from the evaluation table. Actual image coordinate of the candidate electrode accords with the image coordinate of the origin electrode of the electrode map at that time, then the image coordinates of the electrodes in the electrode pattern are determined, and the positioning of electrodes is completed (step S126). If not, at step S125, the positioning of electrodes is not achieved by the extracted core electrode, then the examination process is repeated after evaluating the number of extracted electrodes (step S127).

The positioning process will be explained by specific examples. In case of the input pattern shown in FIG. 17, a logical or defined electrode pattern is shown in FIG. 18, and the initial electrode map coordinate system H0V0 after extraction of electrodes is produced as shown in FIG. 21. An electrode map coordinate system HV is separated from the system H0V0 in the order of circled numbers in FIG. 21. This order depends on the corner triangle sweep described before. FIG. 21 shows the state for the time of a second coupling vector (−1, 0).

A positioning evaluation table of FIG. 42 shows mismatch numbers that each candidate observes, assuming the candidate itself to be located at the origin of the system HV at every origin separation. Marks * indicate the death of candidates because each mismatch number exceeds the allowable number (e=0). Match/mismatch is judged between the logical values of the logical electrode pattern (of FIG. 18) and the observed values (on the HV system in FIG. 21). IJ in FIG. 18 is the coordinate axes for the corner rectangle sweep mode described before. A first coupling vector ①=(0, 0), this is the state shown in FIG. 20, which completely matches the pattern of FIG. 18 when a candidate C1 is at the origin, to thereby lead the mismatch number observed by C1 to 0.

From a view point C2 when the origin is put to C2, the mismatch number is easily overlooked to count to 10. For example, C1 should exist at the right of C2, but the coordinate (1, 0) at the right of the HV origin is vacant, thereby counting one mismatch number. Therefore, the candidate C2 dies because its mismatch number far exceeds the allowable number e. The candidates C3–C5 are the same as C2.

Next, when the origin is separated to locate at ②, the coupling vector is (−1, 0), which state is shown in FIG. 21. This state completely matches the pattern of FIG. 18 when a candidate C2 is at the origin, to thereby lead the mismatch number observed by C2 to 0. To the contrary, C1 dies at this case. The other candidates also die same as C1. Repeating the same process as above for coupling vectors ③④⑤⑥, the positioning evaluation table is obtained as shown in FIG. 42. Here, ⑤ is not a real electrode, the examination is not executed.

From the table of FIG. 42, each candidate has a minimum value 0 at only one position. This state defines an undoubted positioning state.

FIG. 43 is a positioning evaluation table resulting from the application of the invention to the BGA component shown in FIG. 1(A) adopted from the prior art explanation. A first core electrode has been C2. Since C1 and C3 are located higher than C2, electrodes for positioning are not assigned thereto, thereby being led to death every examination cycle. Other candidates report a mismatch number 0, and correct recognition is completed. Here, the allowable mismatch number was 4.

Figure 45:
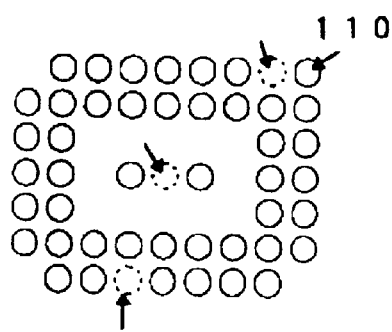
FIG. 45 is one example of a BGA pattern for explaining the positioning of electrodes.

On the other hand, FIG. 44 is a resultant evaluation table from application of the invention in the case of an irregular BGA component as shown in FIG. 45 being imaged and the defined electrode pattern for the component shown in FIG. 1(A) being input as a defined pattern. The component of FIG. 45 differs from the defined pattern at 4 points indicated by arrows. An allowable mismatch number is 4 because of the same defined pattern. The first core electrode actually obtained was an electrode 110 in FIG. 45, that is, the point 110 is a starting point for cycles ①② - - - . Since no candidates belong to ①, all candidates die. ② is neglected because of a vacant electrode. After ③, each candidate equally reports a mismatch number 4. With the allowable mismatch number passed, correct recognition (positioning) is completed. Meanwhile, in practical mounting operation, after the positioning, electrode positions where an error is detected are generally displayed for permitting the operator to judge the result.

With the foregoing positioning process, the position of an electrode pattern for an object component is determined based on the coordinate of the extracted electrode pattern; that is, image coordinates for the electrodes of the component are determined. This state corresponds to the positioning completion state S4 in FIG. 5. Process at the state S4 is not explained, because it does not directly relate to the present invention. However, in practical mounting operation, correction values for the deviations of XY coordinate and angular orientation are usually output based on the image coordinates of the electrodes after examination of the shape and position of the obtained electrodes, for precise mounting by a robot.

As to the examination of position, the electrode coordinate predicted from the triangulation points usually has more or less displacement with regard to the actual electrode extracted from the image. A standard deviation of these displacements within the limited area will be obtained by statistical operation, to thereby easily judge abnormal electrodes having large displacement.

Other Embodiments

In the embodiment described above, the brightness of each electrode is higher than that of background, but the effect of the invention is the same in the case that the brightness of each electrode is lower than that of background (for example, soldering ball electrodes on a ceramic base). In this case, only the process for extracting an electrode from a window may be changed with reversing larger/smaller judgment on threshold.

As to the process for finding a core electrode, the corner rectangle sweep mode can be applied instead of the corner triangle sweep mode with about the same effect, although process efficiency may decrease a bit. The same is the case with the selection process of candidate electrodes, and so is the process for separating an origin electrode at the positioning stage.

As explained above, the present invention provides the following advantages.

The positioning process depends only on information about existing/vacant electrodes extracted from an image. Therefore, the positioning is irrelevant to a foreign substance extracted as an electrode by eliminating it as a spurious electrode. Further, although the spurious electrodes are included without being removed because of the difficulty of discriminating the foreign substances from the real electrodes, correct positioning can be achieved if mismatch numbers fall within the allowable mismatch number. As a result, it is possible to precisely recognize most of commercially available components having a grid array of electrodes.

An electrode is extracted from a window, and the center coordinate of the window is produced by the coordinate prediction section based on triangulation points, whereby the coordinates are accurately predicted even for a distorted image. Further, since binary data of each window are produced by an automatically created threshold according to the neighbor brightness, recognition is not susceptible to uneven illumination and noise, and it is possible to extract electrodes from a dim or bright image on the whole. As a result, superior quality cameras or illuminators are not required, and thereby the apparatus can be constructed with less costly devices.

Since there exist small image areas that are not accessed, the image memory is less frequently accessed in total. The time to find a core electrode is proportional to its sweep area, but it is a short time compared with total process time. The process time after finding the core electrode is the sum of the time of logical judgment and the time to extract electrodes from predicted areas. This process time is proportional to the number of electrodes in the invention, which is theoretically shorter than that of the conventional method that is proportional to an image size.

The invention is applicable to an image having a component corner, and an entire component image is not necessary. A known partial recognition is a method for positioning a part of electrode group from a partial image of a large size component, the partial image being one of a plurality of divided images repeatedly obtained from the component. The present invention can theoretically execute the partial recognition.

The present invention has been described with reference to particular illustrative embodiments. It is to be understood that the invention is not limited to the above-described embodiments, and that various changes and modifications may be made by those of ordinary skill in the art without departing from the spirit and scope of the appended claims.

What is claimed is:

1. A method of recognizing electrode positions from an image of a component having a predetermined electrode pattern, the method comprising:
   extracting electrodes by sequentially placing a proper size small window within the component image;
   producing an extracted electrode pattern;
   obtaining coordinates of the extracted electrodes;
   determining an allowable mismatch number based on the predetermined electrode pattern and one of the corners thereof;
   collating the extracted electrode pattern with the predetermined electrode pattern by overlaying with each other, including confirmation of the electrode positioning at the time of collating using said allowable mismatch number; and
   determining image coordinates for the electrodes of the predetermined electrode pattern based on the collated result.

2. The method as claimed in claim 1, wherein a gravity center of the predetermined electrode pattern is obtained to determine a starting position for sweeping the image according to the gravity center.

3. The method as claimed in claim 1, wherein electrodes neighboring a corner of the predetermined electrode pattern are chosen as candidate electrodes for positioning the imaged electrodes.

4. The method as claimed in claim 1, wherein a search area of the image is reduced when the electrodes are extracted.

5. The method as claimed in claim 1, wherein a core electrode is extracted with the image being swept by the small window.

6. The method as claimed in claim 1, wherein a physical coordinate for a specified electrode logical coordinate is predicted based on logical coordinates and physical coordinates of previously extracted electrodes.

7. The method as claimed in claim 5, wherein, after the core electrode is extracted, a physical coordinate for a specified electrode logical coordinate is predicted based on logical coordinates and physical coordinates of previously extracted electrodes and each electrode is extracted with the small window placed within a predicted area.

8. The method as claimed in claim 1, wherein an electrode coordinate is predicted with the use of preferable datum points on a grid for the extracted electrodes.

9. The method as claimed in claim 1, wherein one or more spurious electrodes are removed with examination of previously extracted electrodes.

10. The method as claimed in claim 1, wherein each coordinate of the extracted electrodes is determined with a small window placed into a local image area for an electrode to be extracted.

11. An apparatus for recognizing electrode positions from an image of a component having a predetermined electrode pattern, the apparatus comprising:
   means for placing a proper size small window within the component image;
   means for extracting an electrode through the small window;
   means for producing an extracted electrode pattern;
   means for determining coordinates of extracted electrodes;
   allowable mismatch number decision means for determining an allowable mismatch number based on the predetermined electrode pattern and one of the corners thereof;
   means for collating the extracted electrode pattern with the predetermined electrode pattern by overlaying with each other and for confirming the electrode positioning at the time of collating using said allowable mismatch number; and
   means for determining image coordinates for the electrodes of the predetermined electrode pattern based on the collated result.

12. The apparatus as claimed in claim 11, wherein the apparatus is provided with candidate electrode decision means for choosing electrodes neighboring a corner of the predetermined electrode pattern as candidate electrodes for positioning.

13. The apparatus as claimed in claim 11, wherein the apparatus is provided with core electrode finding means for finding a core electrode neighboring a corner within the image.

14. The apparatus as claimed in claim 11, wherein the apparatus is provided with coordinate prediction means for predicting a physical coordinate for a specified electrode logical coordinate based on logical coordinates and physical coordinates of previously extracted electrodes.

15. The apparatus as claimed in claim 11, wherein the apparatus is provided with triangulation point generation means for generating preferable datum points on a grid for the extracted electrodes.

16. The apparatus as claimed in claim 11, wherein the apparatus is provided with spurious electrode removal means for removing one or more spurious electrodes by examination of previously extracted electrodes.

17. The apparatus as claimed in claim 11, wherein the apparatus is provided with means for determining each coordinate of the extracted electrodes with a small window placed into a local image area for an electrode to be extracted.

18. The apparatus as claimed in claim 11, wherein the apparatus is provided with collating direction determination means for determining a starting position for sweeping the image according to an obtained gravity center of the predetermined electrode pattern.

19. The apparatus as claimed in claim 11, wherein the apparatus is provided with search area reduction means for reducing search areas of the image when the electrodes are extracted.

20. The apparatus as claimed in claim 11, wherein the apparatus is provided with window generation means for generating the small window within a predicted area.

21. An electrode position recognizer comprising:

a camera for capturing an image from a component having a predetermined electrode pattern; and a control section including a window generation section, an electrode extraction section, an extracted electrode pattern producing section, an extracted electrode coordinate determining section, an allowable mismatch number decision section for determining an allowable mismatch number based on the predetermined electrode pattern and one of the corners thereof, a pattern collating section for confirmation of the electrode positioning at the time of collating using said allowable mismatch number, and an imaged electrode coordinate determining section.

* * * * *